United States Patent
Angrish et al.

(10) Patent No.: US 11,368,374 B1
(45) Date of Patent: *Jun. 21, 2022

(54) SYSTEM AND METHOD FOR MANAGING VIRTUAL AND DEDICATED SERVERS

(71) Applicant: International Business Machines Corporation, Armonk, NY (US)

(72) Inventors: Yogesh Angrish, San Francisco, CA (US); Yueqin Lin, Cupertino, CA (US); Martin A. Berryman, Walnut Creek, CA (US); Justin M. Kitagawa, Lafayette, CA (US); Paul Lappas, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 44 days.

This patent is subject to a terminal disclaimer.

(21) Appl. No.: 17/015,036

(22) Filed: Sep. 8, 2020

Related U.S. Application Data

(60) Continuation of application No. 16/424,375, filed on May 28, 2019, now Pat. No. 10,778,531, which is a
(Continued)

(51) Int. Cl.
*H04L 41/22* (2022.01)
*G06F 15/177* (2006.01)
(Continued)

(52) U.S. Cl.
CPC ............ *H04L 41/22* (2013.01); *G06F 15/177* (2013.01); *H04L 12/4641* (2013.01); *H04L 41/0806* (2013.01); *H04L 41/0879* (2013.01); *H04L 41/12* (2013.01); *H04L 43/00* (2013.01); *H04L 43/0817* (2013.01); *H04L 65/611* (2022.05)

(58) Field of Classification Search
None
See application file for complete search history.

(56) References Cited

U.S. PATENT DOCUMENTS

| | | | |
|---|---|---|---|
| 5,930,773 | A | 7/1999 | Crooks et al. |
| 6,529,784 | B1 | 3/2003 | Cantos et al. |

(Continued)

OTHER PUBLICATIONS

Author Unknown, "Amazon EC2: Developer Guide (API Version Mar. 1, 2007)," 2007 (Month NA), Amazon.Com, Inc., Seattle, Washington, USA.

(Continued)

*Primary Examiner* — Saad Khawar

(57) ABSTRACT

A hosting system is provided. The hosting system includes a grid of hardware nodes for provisioning virtual servers including a first virtual server for a first user and a second virtual server for a second user. The hosting system further includes dedicated servers including a first dedicated server for the first user and a second dedicated server for the second user. A switch, in response to the first virtual server and the second virtual server having overlapping virtual local area network (VLAN) identifications (IDs), defines a first broadcast domain for the first user and a second broadcast domain for the second user, places the first virtual server and the first dedicated server in the first broadcast domain, and places the second virtual server and the second dedicated server in the second broadcast domain.

20 Claims, 28 Drawing Sheets

Related U.S. Application Data continuation of application No. 15/070,201, filed on Mar. 15, 2016, now Pat. No. 10,305,743, which is a division of application No. 13/023,520, filed on Feb. 8, 2011, now Pat. No. 9,288,117.

(51) Int. Cl.
*H04L 41/0806* (2022.01)
*H04L 43/0817* (2022.01)
*H04L 43/00* (2022.01)
*H04L 41/12* (2022.01)
*H04L 12/46* (2006.01)
*H04L 41/08* (2022.01)
*H04L 65/611* (2022.01)

(56) References Cited

U.S. PATENT DOCUMENTS

| | | |
|---|---|---|
| 6,662,221 B1 | 12/2003 | Gonda et al. |
| 6,868,444 B1 | 3/2005 | Kim et al. |
| 6,888,836 B1 | 5/2005 | Cherkasova |
| 6,912,221 B1 | 6/2005 | Zadikian et al. |
| 6,985,937 B1 | 1/2006 | Keshav et al. |
| 7,054,308 B1 | 5/2006 | Conway |
| 7,080,378 B1 | 7/2006 | Noland et al. |
| 7,158,972 B2 | 1/2007 | Marsland |
| 7,257,811 B2 | 8/2007 | Hunt et al. |
| 7,321,893 B1 | 1/2008 | Rambacher et al. |
| 7,334,157 B1 | 2/2008 | Graf et al. |
| 7,383,327 B1 | 6/2008 | Tormasov et al. |
| 7,392,403 B1 | 6/2008 | Munetoh |
| 7,398,471 B1 | 7/2008 | Rambacher et al. |
| 7,512,815 B1 | 3/2009 | Munetoh |
| 7,519,696 B2 | 4/2009 | Blumenau et al. |
| 7,577,722 B1 | 8/2009 | Khandekar et al. |
| 7,587,492 B2 | 9/2009 | Dyck et al. |
| 7,649,851 B2 | 1/2010 | Takashige et al. |
| 7,694,082 B2 | 4/2010 | Golding et al. |
| 7,702,843 B1 | 4/2010 | Chen et al. |
| 7,716,446 B1 | 5/2010 | Chen et al. |
| 7,730,486 B2 | 6/2010 | Herington |
| 7,743,107 B2 | 6/2010 | Kovacs et al. |
| 7,752,301 B1 | 7/2010 | Maiocco et al. |
| 7,783,856 B2 | 8/2010 | Hashimoto et al. |
| 7,802,000 B1 | 9/2010 | Huang et al. |
| 7,802,251 B2 | 9/2010 | Kitamura |
| 7,814,495 B1 | 10/2010 | Lim et al. |
| 7,827,294 B2 | 11/2010 | Merkow et al. |
| 7,843,821 B2 | 11/2010 | Kunhappan et al. |
| 7,856,549 B2 | 12/2010 | Wheeler |
| 7,865,893 B1 | 1/2011 | Omelyanchuk et al. |
| 7,912,955 B1 | 3/2011 | Machiraju et al. |
| 7,925,850 B1 | 4/2011 | Waldspurger et al. |
| 7,941,470 B2 | 5/2011 | Le et al. |
| 7,970,917 B2 | 6/2011 | Nakano et al. |
| 7,987,289 B2 | 7/2011 | Mason et al. |
| 8,001,247 B2 | 8/2011 | Salevan et al. |
| 8,006,079 B2 | 8/2011 | Goodson et al. |
| 8,032,635 B2 | 10/2011 | Moore |
| 8,032,899 B2 | 10/2011 | Archer et al. |
| 8,037,280 B2 | 10/2011 | Pandey et al. |
| 8,046,694 B1 | 10/2011 | Lappas et al. |
| 8,095,662 B1 | 1/2012 | Lappas et al. |
| 8,095,931 B1 | 1/2012 | Chen et al. |
| 8,117,495 B2 | 2/2012 | Graham et al. |
| 8,171,115 B2 | 5/2012 | Hamilton et al. |
| 8,184,631 B2 | 5/2012 | Kunhappan et al. |
| 8,195,866 B2 | 6/2012 | Ginzton |
| 8,219,653 B1 | 7/2012 | Keagy et al. |
| 8,280,790 B2 | 10/2012 | Lappas et al. |
| 8,352,608 B1 | 1/2013 | Keagy et al. |
| 8,364,802 B1 | 1/2013 | Keagy et al. |
| 8,374,929 B1 | 2/2013 | Lappas et al. |
| 8,418,176 B1 | 4/2013 | Keagy et al. |
| 8,443,077 B1 | 5/2013 | Lappas et al. |
| 8,453,144 B1 | 5/2013 | Keagy et al. |
| 8,458,717 B1 | 6/2013 | Keagy et al. |
| 8,468,535 B1 | 6/2013 | Keagy et al. |
| 8,473,587 B1 | 6/2013 | Lappas et al. |
| 8,495,512 B1 | 7/2013 | Lappas et al. |
| 8,528,107 B1 | 9/2013 | Ginzton et al. |
| 8,533,305 B1 | 9/2013 | Keagy et al. |
| 8,601,226 B1 | 12/2013 | Lappas et al. |
| 8,656,018 B1 | 2/2014 | Keagy et al. |
| 9,288,117 B1 | 3/2016 | Angrish et al. |
| 10,305,743 B1 * | 5/2019 | Angrish .................. H04L 41/22 |
| 10,778,531 B1 * | 9/2020 | Angrish .............. H04L 12/4641 |
| 2004/0054793 A1 | 3/2004 | Coleman |
| 2004/0267897 A1 | 12/2004 | Hill et al. |
| 2005/0038834 A1 | 2/2005 | Souder et al. |
| 2005/0120160 A1 | 6/2005 | Plouffe et al. |
| 2006/0089995 A1 | 4/2006 | Kerr et al. |
| 2006/0136761 A1 | 6/2006 | Frasier et al. |
| 2006/0155735 A1 | 7/2006 | Traut et al. |
| 2006/0168224 A1 | 7/2006 | Midgley |
| 2006/0174087 A1 | 8/2006 | Hashimoto et al. |
| 2006/0184653 A1 | 8/2006 | Riel |
| 2006/0195715 A1 | 8/2006 | Herington |
| 2006/0277542 A1 | 12/2006 | Wipfel |
| 2007/0028239 A1 | 2/2007 | Dyck et al. |
| 2007/0043860 A1 | 2/2007 | Pabari |
| 2007/0050763 A1 | 3/2007 | Kagan et al. |
| 2007/0101334 A1 | 5/2007 | Atyam et al. |
| 2007/0174429 A1 | 7/2007 | Mazzaferri et al. |
| 2007/0233838 A1 | 10/2007 | Takamoto et al. |
| 2007/0234302 A1 | 10/2007 | Suzuki et al. |
| 2007/0240160 A1 | 10/2007 | Paterson-Jones et al. |
| 2007/0250608 A1 | 10/2007 | Watt |
| 2007/0260721 A1 | 11/2007 | Bose et al. |
| 2007/0266433 A1 | 11/2007 | Moore |
| 2007/0283348 A1 | 12/2007 | White |
| 2007/0297428 A1 | 12/2007 | Bose et al. |
| 2008/0049786 A1 | 2/2008 | Ram et al. |
| 2008/0059556 A1 | 3/2008 | Greenspan et al. |
| 2008/0065854 A1 | 3/2008 | Schoenberg et al. |
| 2008/0086726 A1 | 4/2008 | Griffith et al. |
| 2008/0104608 A1 | 5/2008 | Hyser et al. |
| 2008/0148300 A1 | 6/2008 | Archer et al. |
| 2008/0178281 A1 | 7/2008 | Narayanaswami et al. |
| 2008/0201414 A1 | 8/2008 | Husain et al. |
| 2008/0244600 A1 | 10/2008 | Wong et al. |
| 2009/0049453 A1 | 2/2009 | Baran et al. |
| 2009/0063750 A1 | 3/2009 | Dow |
| 2009/0172662 A1 | 7/2009 | Liu |
| 2009/0182605 A1 | 7/2009 | Lappas et al. |
| 2009/0198769 A1 | 8/2009 | Keller et al. |
| 2009/0228883 A1 | 9/2009 | Gebhart et al. |
| 2009/0282406 A1 | 11/2009 | Malki et al. |
| 2009/0300210 A1 | 12/2009 | Ferris |
| 2009/0300660 A1 | 12/2009 | Solomon et al. |
| 2010/0011178 A1 | 1/2010 | Feathergill |
| 2010/0046546 A1 | 2/2010 | Ram et al. |
| 2010/0070970 A1 | 3/2010 | Hu et al. |
| 2010/0070978 A1 | 3/2010 | Chawla et al. |
| 2010/0082799 A1 | 4/2010 | DeHaan et al. |
| 2010/0128432 A1 | 5/2010 | Miller |
| 2010/0138828 A1 | 6/2010 | Hanquez et al. |
| 2010/0235831 A1 | 9/2010 | Dittmer |
| 2010/0328849 A1 | 12/2010 | Ewing et al. |
| 2010/0332658 A1 | 12/2010 | Elyashev |
| 2011/0004676 A1 | 1/2011 | Kawato |
| 2011/0055711 A1 | 3/2011 | Jaquot et al. |
| 2011/0055714 A1 | 3/2011 | Vemulapalli et al. |
| 2011/0090911 A1 * | 4/2011 | Hao ........................ H04L 49/70 370/395.53 |
| 2011/0099267 A1 | 4/2011 | Suri et al. |
| 2011/0106949 A1 | 5/2011 | Patel et al. |
| 2011/0107406 A1 | 5/2011 | Frost et al. |
| 2011/0148895 A1 | 6/2011 | Burckart et al. |
| 2011/0149800 A1 * | 6/2011 | Ryan .................... H04L 12/467 370/254 |

(56) References Cited

U.S. PATENT DOCUMENTS

| | | | |
|---|---|---|---|
| 2011/0153697 A1 | 6/2011 | Nickolov et al. | |
| 2012/0131177 A1* | 5/2012 | Brandt | H04L 61/1511 709/224 |
| 2012/0151358 A1 | 6/2012 | Joanny et al. | |

OTHER PUBLICATIONS

Author Unknown , "Amazon EC2: Developer Guide (API Version Aug. 29, 2007)," 2007 (Month NA), Amazon.Com, Inc., Seattle, Washington, USA.
Author Unknown, "Amazon EC2: Developer Guide (API Version Jun. 26, 2006)," 2006 (Month NA), Amazon.Com, Inc., Seattle, Washington, USA.
Author Unknown, "Amazon EC2: Developer Guide (API Version Oct. 1, 2006 )," 2006 (Month NA), Amazon.Com, Inc., Seattle, Washington, USA.
Author Unknown, "Amazon EC2: Developer Guide (API Version Jan. 3, 2007)," 2007 (Month NA), Amazon.Com, Inc., Seattle, Washington, USA.
Author Unknown, "Amazon EC2: Developer Guide (API Version Jan. 19, 2007)," 2006 (Month NA), Amazon.Com, Inc., Seattle, Washington, USA.
Author Unknown, "Amazon Elastic Compute Cloud (Amazon EC2)—Limited Beta FAQs," Jul. 2007 (web page archive date from web.archive.org), http://web.archive.org/web/20070626055456/www.amazon.com/b?e-UTF8&node=20I5910I I, Amazon.Com, Inc.
Author Unknown, "Amazon Elastic Compute Cloud (Amazon EC2)—Limited Beta," Jul. 2007 (web page archive date from web.archive.org), http://web.archive.org/web/20070705164650m2/www.amazon.com/b?ie=UTF8&node=201590011, Amazon.Com, Inc.
Author Unknown, "Applogic 2.0 Beta Program," Jul. 2007 (web page archive date from web.archive.erg), http:/lweb.archive.orQ/web/20070701162528/www.3tera.com/apploQic20beta.html, 3TERA, Inc.
Author Unknown, "AppLogic 2.0—What's new," Jul. 2007 (web page archive date from web.archive.org), http://web.archive.org/web/20070701162502/www.3tera.com/applogic20.html, 3TERA, Inc.
Author Unknown, "Applogic—Application Monitoring," Jul. 2007 (web page archive date from web.archive.erg), http://web.archive.org/web/20070629035849/www.3tera.comlapplogicmonitor.html, 3TERA, Inc.
Author Unknown, "Applogic Features," Jul. 2007 (web page archive date from web.archive.erg), http://web.archive.org/web/2007063005 1 607 /www.3tera.comlapplogicfeatures.html, 3 TERA, Inc.
Author Unknown, "AppLogic Hardware Configuration," Jul. 2007 (web page archive date from web. archive. org), http:/ /web. archive.org/web/20070707062814/www .3 tera. com/applogichw .html, 3TERA, Inc.
Author Unknown, "AppLogic Overview," Jul. 2007 (web page archive date from web.archive.erg), http://web.archive.org/web/2007070 1 1 61932/www.3tera.com/applogic.html, 3TERA, Inc.
Author Unknown, "AppLogic Usage," Jul. 2007 (web page archive date from web.archive.erg), http://web.archive.org/web/200707 1204273 l/www.3tera.com/applogicusage. html, 3TERA, Inc.
Author Unknown, "AppLogic User Interface," Jul. 2007 (web page archive date from web.archive.erg), http://web.archive.org/web/20070704235539/www.3tera.com/applogicui.html, 3TERA, Inc.
Author Unknown, "Applogic Users," Jul. 2007 (web page archive date from web.archive.erg), http://web.archive.org/web/2007063006l258/www.3tera.com/applogicusers.html, 3TERA, Inc.
Author Unknown, "HP Systems Insight Manager 5.1 User Guide," Jan. 2007, 679 pages, Hewlett-Packard, USA. cited by applicant.
Author Unknown, "Introduction to VMware Infrastructure: ESX Server 3.5, ESX Server 3i version 3.5, Virtua!Center 2.5," Dec. 2007, pp. 1-46, Revision: Dec. 13, 2007, VMware, Inc., Palo Alto, California, USA.
Author Unknown, "iSCSI SAN Configuration Guide: ESX Server 3.5, ESX Server 3i version 3.5, Virtua!Center 2.5," Nov. 2007, pp. 1-134, Revision: Nov. 29, 2007, VMware, Inc., Palo Alto, California, USA.
Author Unknown, "Press Release: 3Tera adds Application Monitoring and Multi-CPU Scalability to AppLogic Utility Computing Platform for Saas and Web 2.0 Customers," May 24, 2007, http://www.3tera.com/News/Press-Releases/Archive/3Tera-adds-Application-Monitoringand- Multi-CPU-Scalability-to-AppLogic.php, 3TERA, Inc., Aliso Viejo, California, USA.
Author Unknown, "The first grid operating system that runs and scales existing web applications," Jun. 2006 (web page archive date from web.archive.org), http://web.archive.org/web/20060627045727/www.3tera.com/, 3TERA, Inc.
Author Unknown, "Utility Computing—the easy way to run and scale online applications," Jul. 2007 (web page archive date from web.archive.org), http://web.archive.org/web/20070718011 OI2/www.3tera.com/, 3TERA, Inc.
Author Unknown, "VMware Infrastructure 3 Primer ESX Server 3.5, ESX Server 3i version 3.5, VirtualCenter 2.5," Nov. 2007, Revision: Nov. 29, 2007, VMware, Inc., Palo Alto, California, USA.

* cited by examiner

SYSTEM AND METHOD FOR MANAGING VIRTUAL AND DEDICATED SERVERS

BACKGROUND

Hosting services provide a means whereby multiple users can implement custom server configurations without the overhead costs associated with purchasing, upgrading, and maintaining the equipment needed to implement the configuration. In some cases, a hosting service provider maintains and provisions a grid of hardware nodes that are shared amongst the multiple users. More specifically, resources of a single node can be partitioned and each of these partitions can be allocated to host a server configuration of a different user.

Virtualization provides the means for partitioning the hardware resources amongst the multiple server configurations. Virtualization creates the facade that each server configuration is individually hosted on dedicated equipment with a particular set of resources. Two or more server configurations are provided non-conflicting sets of resources of the same hardware node such that a guaranteed amount of processing resources is available to each such configuration. In other words, a single physical resource is partitioned to operate as multiple logical resources.

In some cases, a hosting service may lease dedicated equipment for users to implement their custom server configurations. The dedicated equipment in some instances may provide higher reliability, increased performance, and greater security as its hardware resources are not shared amongst multiple users. For instance, dedicated servers may be ideal for running applications that users do not want on a multi-tenant environment. One example of such an application is a database application that requires Payment Card Industry (PCI) Data Security Standard compliance.

To facilitate the hosting services, users typically place orders for hardware configurations requiring certain functionality. Users fill out forms or place telephone calls to specify their configurations. At the hosting service site, system operators review the requests and manually determine which nodes or dedicated equipment to distribute the configurations. The operators then configure the nodes or equipment and install software as specified within the order requests.

In some cases, a hosting service may include multiple grids supporting server configurations for different users. However, limitations of virtual local area network (VLAN) protocol (e.g., 802.1Q) may cause problems when deploying network configurations of virtual servers (of multiple grids) and dedicated servers on one network switch. For instance, the VLAN protocol may specify that a VLAN identification (ID) includes 12 bits of data. This limits the maximum number of unique VLAN IDs to around 4096 ($2^{12}$) per grid. As a result, the servers of different users may not be able to be bridged on as a same network switch as it will break the logical division of the users' network configurations.

Reserving a switch for servers on a per-grid basis adversely affects scalability, manageability, and capacity planning; and result in suboptimal resource utilization. Furthermore, the problem of configuring and managing separate network switches for different grids may escalate as new grids are added to the hosting service.

BRIEF SUMMARY

Some embodiments provide a hosting system for managing virtual and dedicated servers. In some embodiments, the system includes a front-end user interface (UI) that allows user to configure, provision, and control virtual and dedicated servers through UI elements. For instance, the front-end UI may include different UI controls that can be used to define configurations for a dedicated server. Examples of such configurations include hardware specifications (e.g., memory, CPU, storage), image specifications (e.g., operating system, applications), network specifications (e.g., IP address), etc.

When a server configuration is received through front-end UI, the hosting system, in some embodiments, sends the server configuration to its back-end logic and automatically deploys the server configuration. In some embodiments, the back-end portion of the system includes different actuators that perform different provisioning tasks. For example, a virtual server may be logically partitioned and configured on a particular node in a grid of hardware resources through one actuator, while a dedicated server may be configured through another different actuator. In addition, one datacenter at a first location may have different a set of actuators than another datacenter at a second location.

To interface with different types of actuators, the hosting system of some embodiments includes a remote management module. In some embodiments, the remote management module (1) receives a user request from the front-end UI, (2) identifies an actuator that can fulfill the user request, and (3) sends the user request to the identified actuator. The remote management system may also identify a datacenter location of the actuator. For example, the remote management module may receive a request for a dedicated server at a datacenter located in the eastern portion of the United States. The remote management module may then identify an actuator that can deploy a dedicated server at the datacenter location and send a message to the actuator to deploy an available dedicated server according to the request.

In some embodiments, the hosting system provides other types of actuators to control or manage servers that are provisioned. For instance, the hosting system may include a message oriented middleware actuator for turning off, turning on, or restarting dedicated servers. The remote management module, in some embodiments, may also communicate with these other types of actuators to manage the provisioned servers.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

Figure 1:
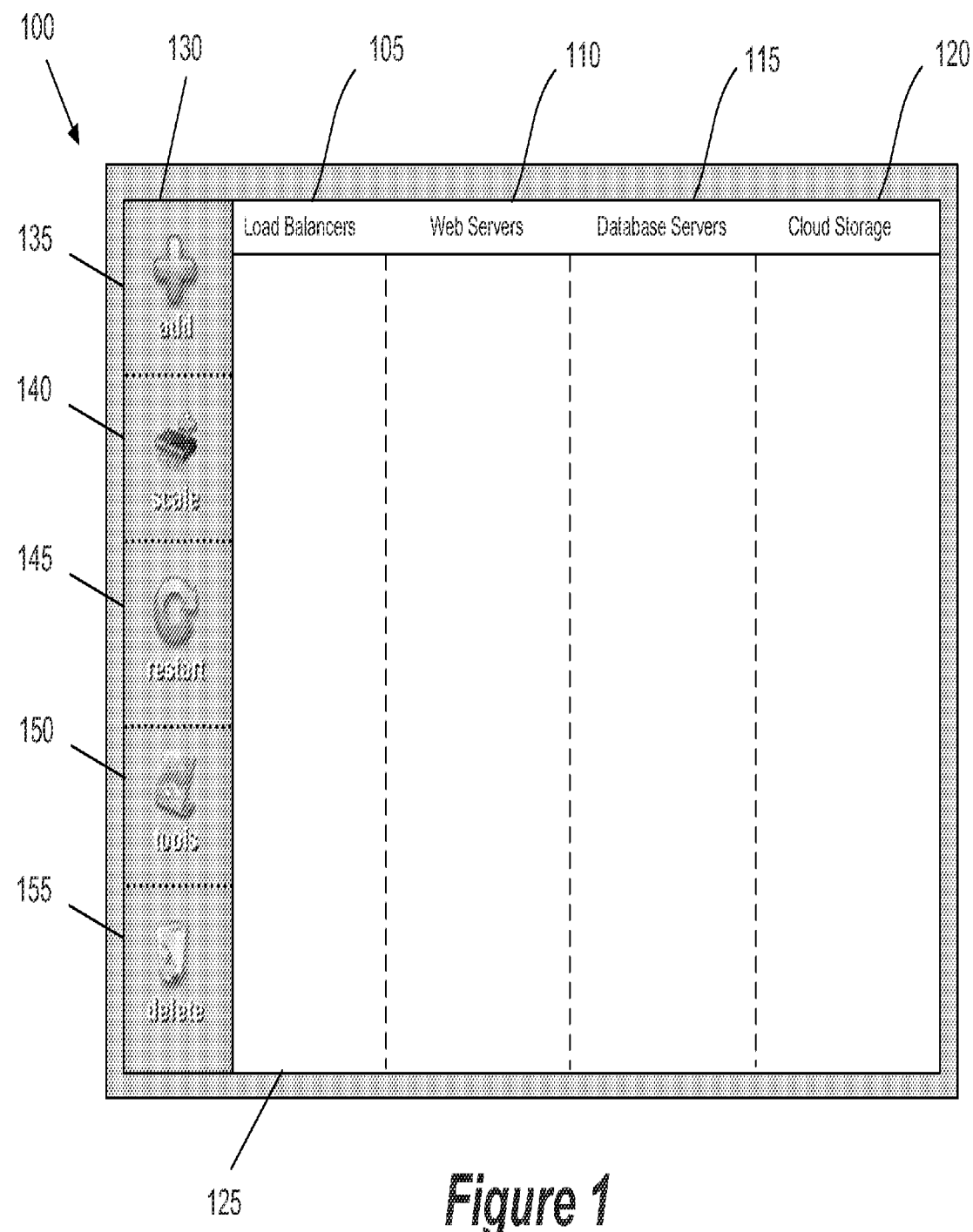
FIG. 1 illustrates an exemplary multi-server control panel of some embodiments.

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments provide a hosting system for managing virtual and dedicated servers. In some embodiments, the system includes a front-end user interface (UI) that allows user to configure, provision, and control virtual and dedicated servers through UI elements. For instance, the front-end UI may include different UI controls that can be used to define configurations for a dedicated server. Examples of such configurations include hardware specifications (e.g., memory, CPU, storage), image specifications (e.g., operating system, applications), network specifications (e.g., IP address), etc.

When a server configuration is received through front-end UI, the hosting system, in some embodiments, sends the server configuration to its back-end logic and automatically deploys the server configuration. In some embodiments, the back-end portion of the system includes different actuators that perform different provisioning tasks. For example, a virtual server may be logically partitioned and configured on a particular node in a grid of hardware resources through one actuator, while a dedicated server may be configured through another different actuator. In addition, one datacenter at a first location may have different a set of actuators than another datacenter at a second location.

To interface with different types of actuators, the hosting system of some embodiments includes a remote management module. In some embodiments, the remote management module (1) receives a user request from the front-end UI, (2) identifies an actuator that can fulfill the user request, and (3) sends the user request to the identified actuator. The remote management system may also identify a datacenter location of the actuator. For example, the remote management module may receive a request for a dedicated server at a datacenter located in the eastern portion of the United States. The remote management module may then identify an actuator that can deploy a dedicated server at the datacenter location and send a message to the actuator to deploy an available dedicated server according to the request.

In some embodiments, the hosting system provides other types of actuators to control or manage servers that are provisioned. For instance, the hosting system may include a message oriented middleware actuator for turning off, turning on, or restarting dedicated servers. The remote management module, in some embodiments, may also communicate with these other types of actuators to manage the provisioned servers.

Several more detailed embodiments of the invention are described in the sections below. Section I provides an overview of a multi-server control panel according to some embodiments. Sections II provides a conceptual architecture diagram of the hosting system of some embodiments. Section III describes example operations performed by the hosting system to provision a dedicated server. Section IV describes example operations performed by the hosting system to control or restart a dedicated server. Section V describes the hosting system defining separate broadcast domains for servers through virtual local area network (VLAN) translations. Finally, Section VI describes a computer system which implements some embodiments of the invention.

I. Multi-Server Control Panel User Interface

A. Configuring and Modifying Servers

Some embodiments provide a graphical user interface ("GUI") that allows users manage servers. In some embodiments, the servers include virtual and dedicated servers. Several examples of this GUI are given below. In several of these examples, the GUI is referred to as a multi-server control panel because it allows the users to configure, provision, and control the servers through UI elements.

In some embodiments, the multi-server control panel provides UI elements that allow users to provision or configure servers by specifying parameters that define or redefine the attributes of the servers. The multi-server control panel of some embodiments displays representations of the servers organized into several tiers, where each tier represents a layer in a server configuration. In other words, each tier represents a logical application layer (e.g., a load balancing layer, a web server layer, an application server layer, a database server layer, storage layer, etc.) in a multi-server configuration.

FIG. 1 illustrates an exemplary multi-server control panel 100 of some embodiments of the invention. The multi-server control panel 100 includes (1) a display area 125 for displaying representations (e.g., graphical, textual) of servers, and (2) a set of controls 130 for adding, deleting, and managing the servers. In some embodiments, the set of controls 130 includes an add button 135, a scale button 140, a restart button 145, a tools button 150, and a delete button 155. The set of controls may also include other controls such as an edit button, a start button, a suspend button, and a view button.

In the example illustrated in FIG. 1, the display area 125 is organized into columns that represent several tiers. The display area 125 includes a load balancer tier 105, a web server tier 110, a database server tier 115, and storage tier 120. The tier organization allows a user to assess a server topology. This tier organization allows the user to scale the server topology by adding one or more servers to, or deleting one or more servers from, a particular tier using the multi-server control panel. For example, a user can scale the system topology by adding a second web server to support a first web server. The user can also scale the system topology by adding another tier (e.g., by adding an application server to a multi-server configuration that includes a load balancer, a web server, and a database).

In some embodiments, this tier organization allows the user to scale the server topology by adding one or more storages (e.g., cloud storages as represented by the storage tier 120). For instance, with the multi-server control, a user can easily allocate a particular amount of storage that he or she intends to use and offload storage maintenance tasks to the hosting service. As a result, the user does not have to buy, upgrade, and maintain physical storages.

Another way in which this tier organization allows the user to scale the server topology is by allowing the users to increase allocated resources (e.g., memory, storage, bandwidth, CPU) for any server in the server topology. That is, the user cannot only increase the system topology vertically (e.g., along the tier organization of the display area 125) but horizontally by allocating additional resources for one or more servers in the system topology. Some embodiments of the multi-server control panel provide UI elements that allow a user to specify one or more attributes of a server (e.g., one or more attributes of a load balancer, a web server, an application server, a database server, etc). Examples of such attributes include the amount of memory, the OS of the server, and the name of the server.

Sections B-C below provide several more detailed examples of how a user can use the multi-server control panel to configure and add servers to a server topology. In particular, Section B describes adding a virtual server to the server topology, and Section C describes adding a dedicated server to the server topology.

B. Adding a Virtual Server

FIGS. 2-5 present several illustrative examples regarding how a user can add a virtual server through the multi-server control panel 100. Specifically, these figures illustrate examples of (1) selecting a web server from a list of available server types, (2) selecting an image containing an operating system for the virtual server, (3) specifying parameters that define the virtual server, and (4) adding the virtual server to a server configuration.

Figure 2:
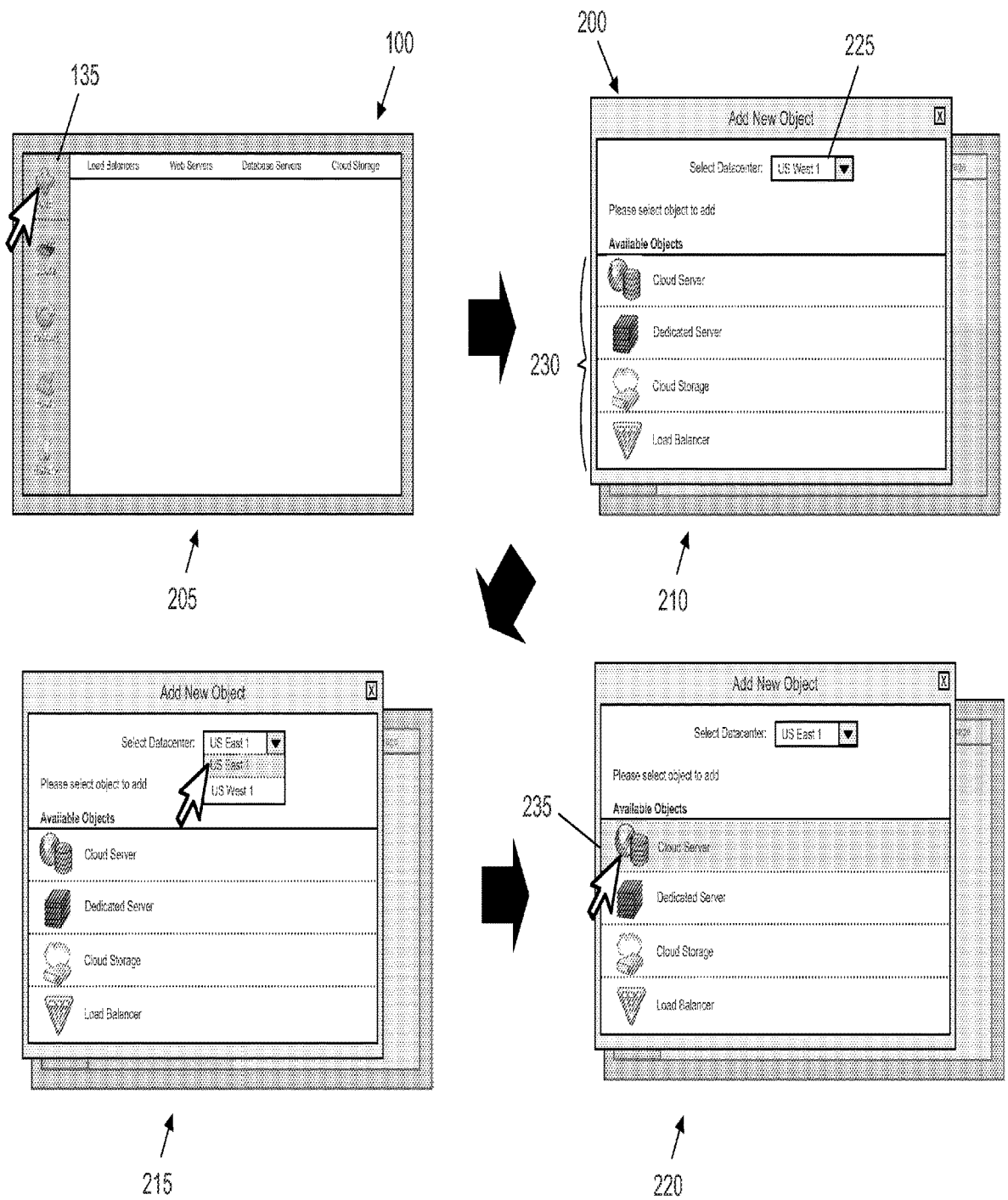
FIG. 2 presents an illustrative example of selecting a web server to add to a server configuration.

FIG. 2 presents an illustrative example of selecting a web server to add to a server configuration. In particular, four operational stages of the 205-220 of the multi-server control panel 100 are shown. A user can begin the process of adding a web server to a server configuration by selecting the add button 135 through a selection input such as input received from a cursor controller (e.g., a mouse, touchpad, trackpad, etc.), from a touchscreen (e.g., a user touching a UI item on the touchscreen), from keyboard input (e.g., a hotkey, key sequence), etc. In the example illustrated in FIG. 2, the selection of the add button 135 causes an object selection window 200 to be displayed.

As shown in stage 210, the object selection window 200 has a list of selectable icons 230 and a datacenter field 225. The list of selectable icons 230 represents different server configuration components or objects (e.g., server, load balancer, storage) that a user can add to a server configuration. In the example illustrated in FIG. 2, the list of selectable icons 230 includes icons for a cloud server, dedicated server, cloud storage, and load balancer. Here, the cloud server represents either a web server or a database server. As will be described below by reference to FIG. 3, in some embodiments, a server is defined as a web server or database server based on the application selected for the server. For example, a server may be defined as a database server when an image selected for the server includes an operating system that is preconfigured with a database application (e.g., SQL server).

The datacenter field 225 allows a user to select a datacenter to host the server configuration. In the example shown in stage 215, the user can select either "US East 1", which represents a datacenter located in the eastern portion of the United States, or "US West 1", which represents a datacenter located in the western portion of the United States. However, additional user-selectable items representing other locations may be available depending on the locations of datacenters of the hosting system (e.g., hosting service provider). The datacenter field 225 may also list datacenters differently. For instance, the datacenter field 225 may list each datacenter with a more specific location information such as state, city, street address, etc.

In some embodiments, the selection of a datacenter (e.g., "US West 1") modifies the available selectable icons in the list of selectable icons 230. That is, several selectable icons may be presented or removed based on the services provided by the selected datacenter. For instance, a selection of a particular datacenter may cause an icon corresponding to the cloud storage to be removed from or presented in the list of selectable icons 230.

When the user scrolls the object list 230, the selected icon may be highlighted. This is shown in the fourth stage 220 with the icon 235 for the cloud server highlighted, while the icons for the dedicated server, cloud storage, and load balancer are not highlighted. The user can select any of the icons in the object list 230 (e.g., by clicking on them or by scrolling to them and pressing the enter key). When the user selects the cloud server icon 235 in the object list 230, the user is presented with an image list window 300, as illustrated in FIG. 3.

Figure 3:
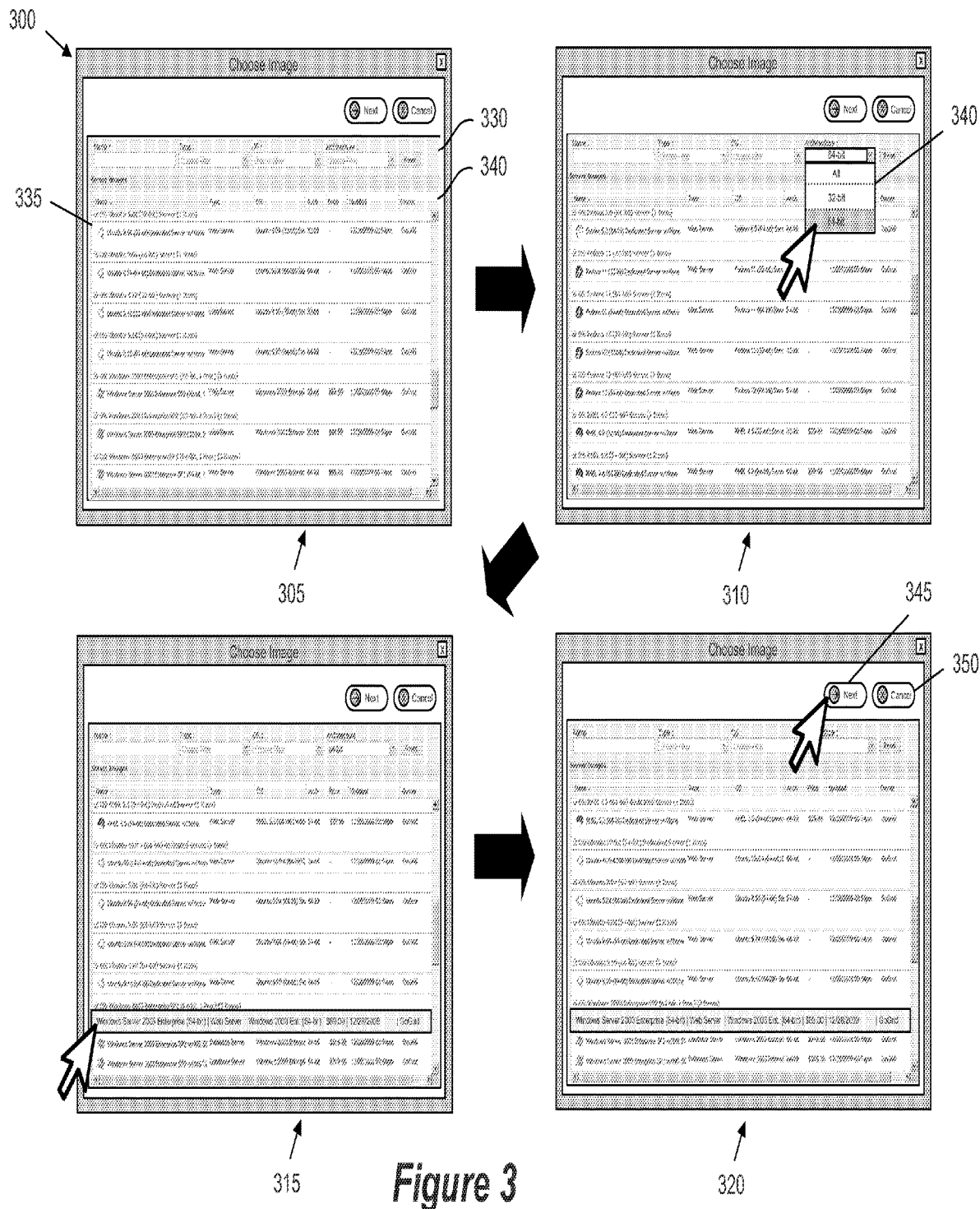
FIG. 3 presents an illustrative example of specifying an operating system for the web server.

FIG. 3 presents an illustrative example of specifying an operating system for the cloud server by using the image selection window 300. Specifically, this figure shows four operational stages 305-320 of selecting an image that includes the operating system. In some embodiments, an image is a copy of the entire state of an operating system. The image may contain just an operating system or the operating system preconfigured with one or more applications. In some embodiments, the images include operating systems with preconfigured web servers that support dynamic web content. The operating system may also be preconfigured with web servers that include an application server or a web application framework such as Ruby on Rails.

In some embodiments, the cloud server is defined as a web server, database server, or application server based on one or more applications that is installed or preconfigured on the operating system. For example, a server may be defined as a database server when an image selected for the server includes an operating system that is preconfigured with a database application (e.g., SQL server). Also, a server may be defined as a web server when an image having an operating system preconfigured with a web server or application server is selected for the server. Furthermore, a server may be defined by default as a web server, application server, or database server when an operating system is not preconfigured with any application.

As shown in the first stage 305, the image selection window 300 includes an image list 335 and a filter tool 330. The image list 335 is an area in the window 300 that lists all available images from which the user can choose for the selected cloud server. In some embodiments, the list of images 335 represents images in one or more image repositories or libraries. The list 335 may include images provided by the hosting service. The list 335 may further include images provided by other users (e.g., customers, general public, etc). Alternatively, the list 335 may include only images provided by other users in some embodiments.

In the example illustrated in FIG. 3, several different selectable images are displayed. Several of these images include Linux distributions, while others include Windows 0 operating systems. The images are also classified as either a web server or a database server. Also, several of the listed images are only available for dedicated severs, and others are available for all types of servers. The list 335 may be sequentially organized by name of the operating system, the type of server (e.g., web server, database server), the type of operating system, architecture (e.g., 32-bit, 64-bit), price, date updated, and owner.

In some embodiments, the images may also be organized or classified by system requirements. In other words, different images may have different system requirements. These requirements may include memory, storage, processor, etc. For instance, some images may be available for a web server that has a minimum of one gigabyte of random access memory (RAM). Also, some images may support a maximum of sixteen gigabytes of RAM. As shown in the first stage 305, the list 335 is alphabetically organized by name based on a sorting tool 340.

The filter tool 330 is a user interface item provided in the image selection window 300 that allows the user to search or filter the image list 335 based on one or more criteria. In the example illustrated in FIG. 3, the user can filter the image list 335 based on the name of the operating system and architecture. The user can also filter the image list 335 based on different types of servers. For instance, the image list 335 may be filtered to only display images that are defined as a web server or database server. Also, the user can reset the filter tool 330 by selecting a reset button.

Having described the image selection window 300, the operations of selecting an image will now be described by reference to the state of this window at the four stages 305-320. In the first stage 305, the image list 335 lists several images from which the user can choose for the cloud server. The second stage 310 shows the user filtering the image list 335 based on the architecture of the operating system. Specifically, a field 340 of the filter tool 330 is selected to reveal a drop-down list of different architectures filter (i.e., 32-bit, 64-bit). The user chooses the 64-bit filter which causes the image list 335 to display only those operating systems matching the filter, as illustrated in the third stage 315.

In the third stage 315, as the user scrolls the list of images 335, the selected image is highlighted. Here, the user selects an image containing a Windows operating system that is defined as a web server. Lastly, the fourth stage 320 show the user's selection of the "Next" button 345 to proceed with configuring the web server. Optionally, the user can cancel the process of adding the web server by selecting the "Cancel" button 350. When the user selects the next button 345, the user is presented with a cloud server form 400, as illustrated in FIG. 4.

Figure 4:
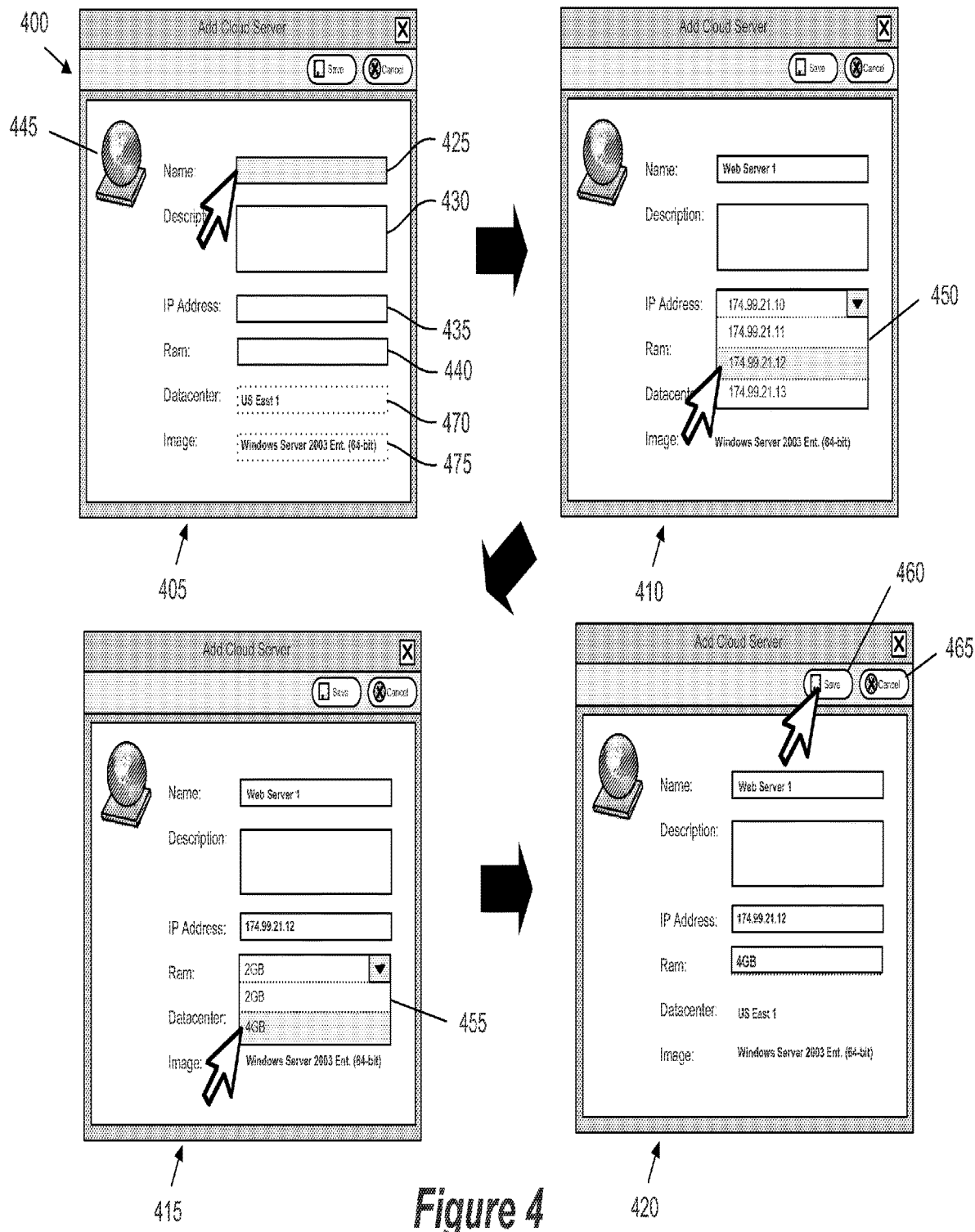
FIG. 4 provides an illustrative example of configuring the web server.

FIG. 4 provides an illustrative example of configuring a web server using the cloud server form 400. Specifically, this figure shows four operational stages 405-420 in defining a web server that will be added to the server configuration. However, before describing these stages, several elements of the cloud server form 400 will be described. As shown in the figure, the cloud server form 400 includes a name field 425, a description field 430, an internet protocol (IP) address field 435, and a memory field 435. The cloud server form 400 also includes several static items based on previously selected options. Specifically, the cloud server form 400 includes (1) a datacenter label 470 that indicates the selected datacenter as "US East 1", (2) an image label 475 that indicates the selected image as a 64-bit Windows operating system, and (3) icon 445 that indicates that the cloud server is to be represented as a web server (e.g., in the web server tier 110 of the display area 125) based on the selected image.

The name field 425 allows the users to specify a descriptive name or site name (e.g., "Web Server 1", "www.abc.com") for the web server. The description field 430 is an optional field that allows a user to describe the web server. For example, through the description field 430, the user can input self-describing information such as the date the web server was added, the content of the web pages provided by the web server, etc. In some embodiments, the name field 425 is automatically populated. For example, when a user specifies a site name during a sign-up process, the name field 425 is automatically populated with the site name provided by the user.

The IP address field 430 allows the users to specify an IP address for the web server. In some embodiments, the IP address field 430 is implemented as a drop-down menu that opens to provide a list of IP addresses that are available for a user to choose as an IP address for the web server. In some embodiments, the available IP addresses are based on a specified hosting plan. For instance, if a user signs up for a particular hosting plan, the multi-server control panel might display ten IP addresses for the servers in the configuration. However, if the user signs up for a different hosting plan, the multi-server control panel might display twenty IP addresses for the servers. In some embodiments, the IP address may be from an IP subnet allocated to a customer's virtual local area network (VLAN).

The memory field 440 allows the user to specify the amount of memory (e.g., RAM in some embodiments) that the user wants to allocate to the web server. Different embodiments allow the user to specify this amount differently. For instance, some embodiments allow a user to enter a numerical amount for the memory. Other embodiments allow the user to enter a percentage that specifies the percentage of an overall amount of memory that the user has purchased for his entire configuration or a particular tier of his configuration. For instance, a user might select a hosting plan with one hundred gigabytes of memory. In such a case, a user might then enter 10% in the memory field. This entry then allocates ten gigabytes of memory to the web server. If the user subsequently changes to a different hosting plan that includes more memory or less memory, the allocated memory for the web server is automatically adjusted to reflect the change in the hosting plan. In some embodiments, this field is implemented as a pull-down menu that opens to provide a list of selectable memory values from which the user can choose for the web server.

Instead of or in conjunction with the memory field 440, other embodiments might include fields for other resources in the web server form 400. Examples of such other resources include physical resources (e.g., storage space, number of CPUs, CPU cycles, etc.), and network resources (e.g., data transfer).

Having described the elements of the cloud server form 400, the operations of configuring a web server will now be described by reference to the state of this form at the four stages 405-420. In the first stage 405, the cloud server form 400 displays several indications related to the previously selected options. Specifically, the datacenter label 470 indicates that the selected datacenter is "US East 1", and the image label 475 indicates that the selected image includes a Windows operating system that is 64-bit. In the first stage 405, the name field 425 is selected (e.g., through a cursor click operation, through a touch operation, etc.) to allow the user to input a name for the web server.

Stage two 410 shows the cloud server form 400 after the user has specified a name for the web server. Here, the IP address field 435 is selected to reveal a drop-down list of different IP addresses 450 from which the user can choose for the web server. As the user scrolls through the list 450, the selected IP address is highlighted. Similarly, in stage three 415, the user specifies the amount of memory to allocate to the web server using the memory field 440. In this example, the user selects "4 GB" from a drop-down list 455 of the memory field 440. The fourth stage 420 shows the user's selection of the "Save" button 460 to proceed with configuring the web server. Alternatively, the user can cancel the process of adding the web server by selecting the "Cancel" button 350.

Figure 5A:
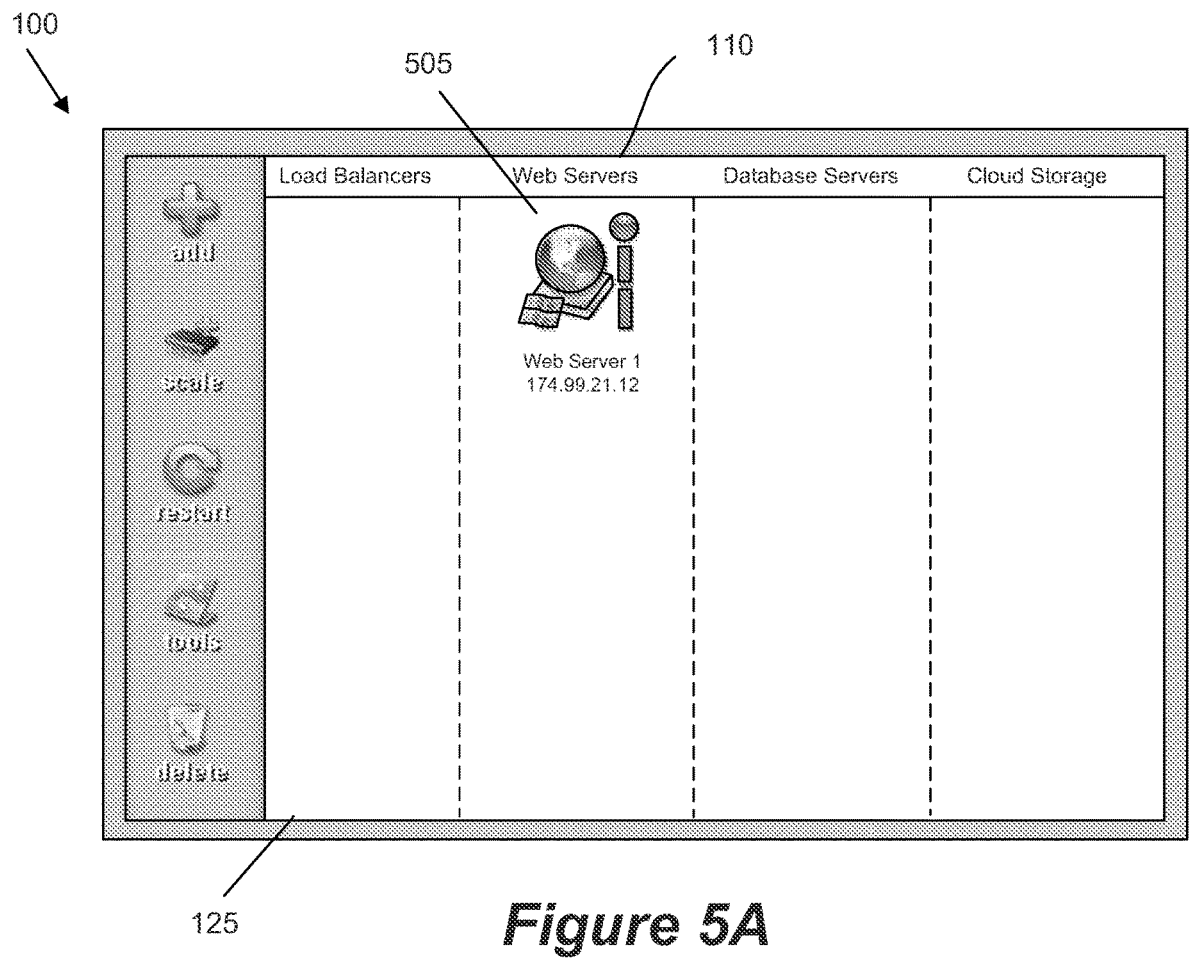
FIG. 5A illustrates the multi-server control panel displaying a web server representation.

FIG. 5A illustrates the display area 125 of the multi-server control panel 100 after the user fills the cloud server form 400 and selects the "Save" button 460 on the form. The selection of the "Save" button 460 causes the front-end logic to define the web server to add a graphical representation 505 of this web server to the web server tier 110 that is displayed in the display area 125. Once a user has specified or modified a configuration for a server using the server form (e.g., the cloud server form 400) and selects the "Save" button 460, a scheduler identifies in real-time a location in a hardware grid for the server and a deployment manager deploys the server in real-time in the identified location (i.e., identified hardware node). Alternatively, some embodiments include a commit button. Once the user has specified or modified one or more server components of the configuration, the user selects the commit button (e.g., by clicking on this button) to direct the scheduler to perform its mapping or remapping of the server components, and to direct the deployment manager to deploy the configuration or modify the deployment of the configuration.

Figure 5B:
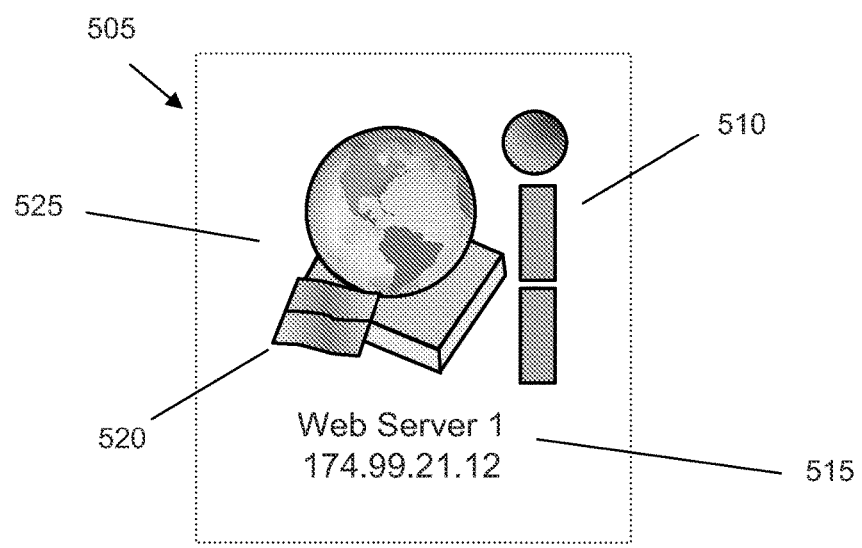
FIG. 5B provides a close-up view of the web server representation.

FIG. 5B provides a close-up view of an example web server representation of the multi-server control panel 100. In this example, the web server representation 505 has a textual element 515 and a graphical element 525. The textual element 515 identifies the web server as "Web Server 1". The textual element 515 of some embodiments identifies the web server by a specified hostname. For instance, if the user specifies the hostname (e.g., 4 4www.abc.com") through the name field 425 of the cloud server form 400, then the display area might display the specified name. In the example illustrated in FIG. 5B, the textual element includes an IP address of the web server.

The graphical element 525 includes a web server icon 520 and a resource meter 510. The web server icon 520 is a graphical representation of the web server. In some embodiments, the web server icon 520 provides an indication of the operating system installed on the web server. For instance, if the user selects an operating system image that includes a particular Linux distribution, the web server icon 520 may display a representation of the particular distribution. As shown in FIG. 5B, the web server icon 520 displays an indication that the operating system selected for the web server is a Windows operating system.

The resource meter 510 is a meter that displays usage of several resources (e.g., CPU and memory) in real-time. In the example illustrated in FIG. 5B, the top resource meter represents CPU usage, and the bottom resource meter represent memory usage. Each meter displays the real-time usage by fluctuating (e.g., moving a bar within the meter) in accord with the real-time usage of the corresponding server. In some embodiments, the fluctuating graphical display is indicative of usage of the resource at different instances in time and/or is indicative of real-time or near-real time usage of the resource.

Also, the fluctuating graphical display changes color in some embodiments when the usage of the particular resource exceeds a particular threshold. For instance, in some embodiments, the bar within a meter changes color when resource usage goes over a predetermined threshold for the resource. One such example is when the memory usage goes over a 50 percent allotted memory capacity, the bottom resource meter might change from one color to another color (e.g., green to yellow).

The threshold in some embodiments is an expected usage rate over duration of time based on the amount of a particular resource that is assigned to the particular user. Hence, the top and bottom meters can indicate different colors at different instances in time to specify excess usage of the resource. These fluctuating display and the changing colors provide a quick visual indication of the CPU and memory being overloaded or "thrashed." Hence, these icons are referred to as "thrash-o-meters" in some embodiments. Instead of or in conjunction with CPU and memory, some embodiments of the multi-server control panel provide real-time usage of other resources. These other resources include network resources (e.g., network traffic, data transfer) and other physical resources (e.g., storage space).

C. Adding a Dedicated Server

FIGS. 6-9 present several illustrative examples regarding how a user can add a dedicated server through the multi-server control panel 100. Specifically, these figures illustrate examples of (1) selecting a dedicated server from a list of available server types, (2) selecting an image containing an operating system for the dedicated server, (3) specifying parameters that define the dedicated server, and (4) adding the dedicated server to a server configuration.

Figure 6:
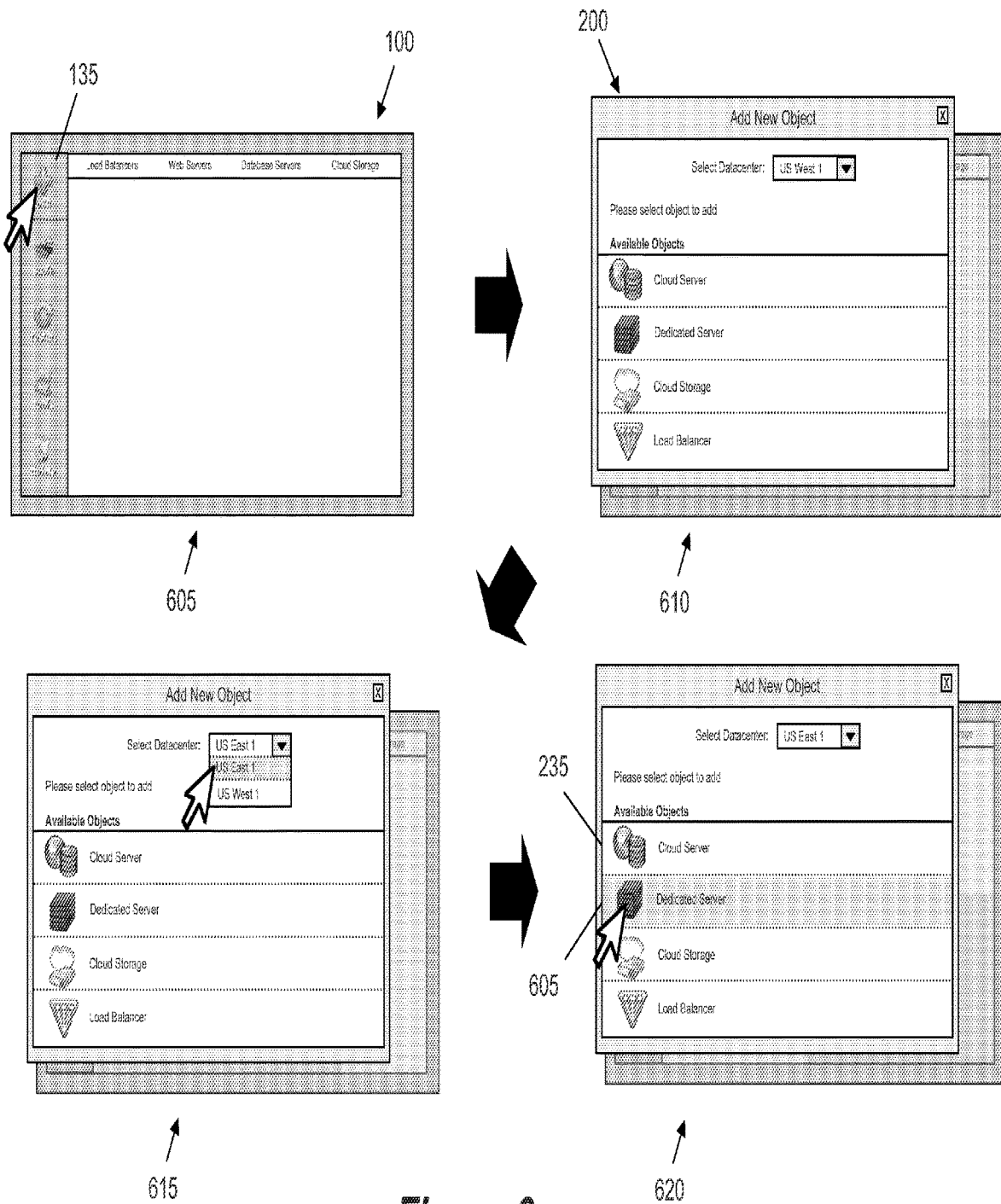
FIG. 6 presents an illustrative example of selecting a dedicated server to add to a server configuration.

FIG. 6 presents an illustrative example of selecting a dedicated server to add to a server configuration. In particular, four operational stages of the 605-620 of the multi-server control panel 100 are shown. These stages 605-620 are similar to the ones discussed above by reference to FIG. 2. However, instead of selecting the cloud server icon 235 in the object list 230, the user selects a dedicated server icon 605. When the user selects the next button 345, the user is presented with a dedicated server form 700, as illustrated in FIG. 7.

Figure 7:
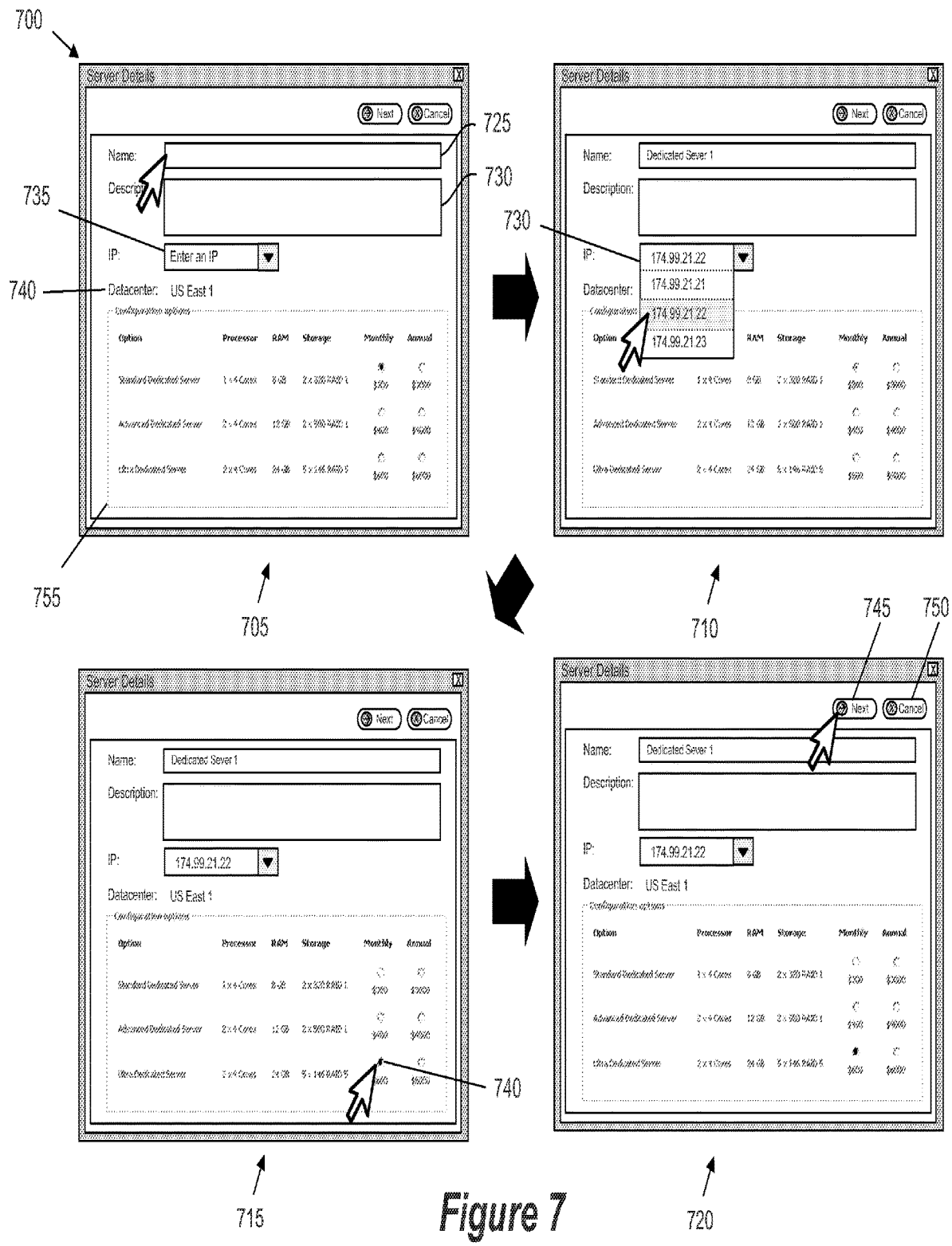
FIG. 7 provides an illustrative example of configuring a dedicated server.

FIG. 7 provides an illustrative example of configuring a dedicated server using the dedicated server form 700. Specifically, this figure shows four operational stages 705-720 in defining a dedicated server that will be added to the server configuration. However, before describing these stages, several elements of the dedicated server form 700 will be described. As shown, the dedicated server form 700 includes a name field 725, a description field 730, an IP address field 735, and a configuration list 755. The dedicated server form 700 also includes a datacenter label 740 indicating the selected datacenter as "US East 1".

The name field 725, description field 730, and IP address field are similar to those discussed above by reference to FIG. 4 with respect to the cloud server form 400. Specifically, the name field 725 allows the users to specify a descriptive name or site name for the dedicated server. The description field 730 is an optional field that allows a user to describe the dedicated server. The IP address field 730 allows the users to specify an IP address for the dedicated server.

The configuration list 755 allows the user to select or specify a hardware configuration for the dedicated server. Specifically, it lists several different configurations for the dedicated server based on processor, memory, and storage. For instance, a first configuration indicates that the dedicated server includes one multiple core processor, 8 GB of memory (i.e., RAM), and two 320 GB RAID storages. The first configuration also includes a price for a monthly or annual plan. As shown, the configuration list 755 lists several other configurations including a second and third configuration with additional processor cores, memory, and storage.

Alternatively or conjunctively, other embodiments might allow the user to select from other resources in the configuration list 735. Examples of such other resources include hardware resources (such as manufacturer and type of CPU, CPU cycles, memory type, storage type, etc.) and network resources (such as data transfer). Different embodiments allow the user to specify the dedicated server configuration differently. For instance, instead of selecting a particular configuration from a list of configurations, some embodiments allow a user to customize a dedicated server by selecting different hardware components. This allows the user to more gradually define the dedicated server that will be added to the server configuration. In some embodiments, the configuration list 755 is implemented as a pull-down menu that opens to provide a list of selectable configurations from which the user can choose for the dedicated server.

Having described the elements of the dedicated server form 700, the operations of configuring a dedicated server will now be described by reference to the state of this form at the four stages 705-720. In the first stage 705, the datacenter field 740 indicates that the selected datacenter for the dedicated server is "US East 1". Also, selecting (e.g., through a cursor click operation, through a touch operation, etc.) the name field 725 allows the user to input a name for the dedicated server.

Stage two 710 shows the dedicated server form 700 after the user has specified a name for the dedicated server. Here, the IP address field 735 is selected to reveal a drop-down list of different IP addresses 750 from which the user can choose. As the user scrolls through the list 750, the selected IP address is highlighted.

In stage three 715, the user selects a radio button 740 corresponding to the third configuration in the configuration list 735. As shown in the figure, the third configuration includes two multiple core processor, 24 GB of memory, and five 146 GB RAID storages. The fourth stage 720 shows the user's selection of the "Next" button 760 to proceed with configuring the dedicated server. In some embodiments, the user can cancel the process of adding the dedicated server at any time by selecting the "Cancel" button 350. When the user selects the next button 745, the user is presented with an image selection window 800, as illustrated in FIG. 8.

Figure 8:
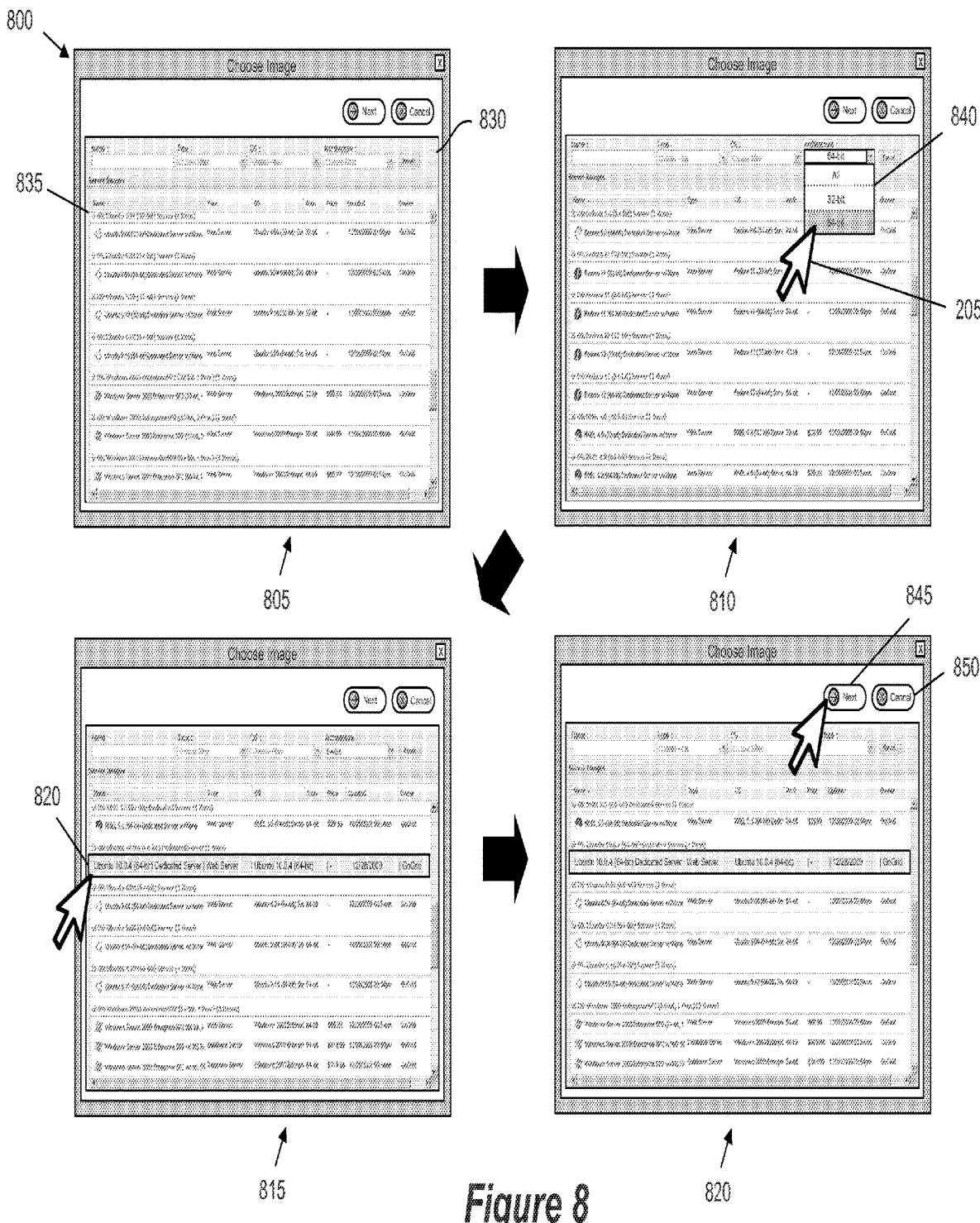
FIG. 8 presents an illustrative example of specifying an operating system for the dedicated server.

FIG. 8 presents an illustrative example of specifying an operating system for the dedicated server by using the image selection window 800. Specifically, this figure shows four operational stages 805-820 of selecting an image that includes the operating system. In some embodiments, an image is a copy of the entire state of an operating system. The image may contain just an operating system or the operating system preconfigured with one or more applications. In some embodiments, the images include operating systems with preconfigured web server applications that support dynamic web content. The operating system may also be preconfigured with web servers that include an application server or a web application framework such as Ruby on Rails.

In some embodiments, a dedicated server is defined as a web server, database server, or application server based on one or more applications that are installed or preconfigured on the operating system. For example, the dedicated server may be defined as a database server when an image selected for the server includes an operating system that is preconfigured with a database application (e.g., SQL server). Also, the dedicated server may be defined as a web server when an image having an operating system preconfigured with a web server or application server is selected as the server. Furthermore, the dedicated server may be defined by default as a dedicated server, application server, or database server when an operating system is not preconfigured with any application.

As shown in the first stage 805, the image selection window 800 includes an image list 835 and a filter tool 830. The image list 835 is an area in the window 800 that lists all available images from which the user can choose for the selected dedicated server. In some embodiments, the list of images 835 represents images in one or more image repositories or libraries. The list 835 may include images provided by the hosting service. The list 835 may further include images provided by other users (e.g., customers, general public, etc). Alternatively, the list 835 may include only images provided by other users in some embodiments.

In the example illustrated in FIG. 8, several different selectable images are displayed. Several of these images include Linux distributions, while others include Windows 0 operating systems. The images are also classified as either a web server or a database server. Also, several of the listed images are only available for dedicated severs, and others are available for all types of servers. The list 835 may be sequentially organized by name of the operating system, the type of server (e.g., web server, database server), the type of operating system, architecture (e.g., 32-bit, 64-bit), price, date updated, and owner.

In some embodiments, the images may also be organized or classified by system requirements. In other words, different images may have different system requirements. These requirements may include memory, storage, processor, etc. For instance, some images may be available for a dedicated server that has a minimum of one gigabyte of random access memory (RAM). Also, some images may support a maximum of sixteen gigabytes of RAM. As shown in the first stage 805, the list 835 is alphabetically organized by name based on a sorting tool 840.

The filter tool 830 is a user interface item provided in the image selection window 800 that allows the user to search or filter the image list 835 based on one or more criteria. In the example illustrated in FIG. 8, the user can filter the image list 835 based on the name of the operating system and architecture. The user can also filter the image list 835 based on different types of servers. For instance, the image list 335 may be filtered to only display images that are defined as a web server or database server. Also, the user can reset the filter tool 830 by selecting a reset button.

Having described the image selection window 800, the operations of selecting an image will now be described by reference to the state of this window at the four stages 805-820. In the first stage 805, the image list 835 lists several images from which the user can choose for the dedicated server. The second stage 810 shows the user filtering the image list 835 based on the architecture of the operating system. Specifically, a field 840 of the filter tool 830 is selected to reveal a drop-down list of different architectures filter (i.e., 32-bit, 64-bit). The user chooses the 64-bit filter which causes the image list 835 to display only those operating systems matching the filter, as illustrated in the third stage 815.

In the third stage 815, as the user scrolls the list of images 835, the selected image is highlighted. Here, the user selects an image containing a Linux operating system that is defined as a web server. The fourth stage 820 show the user's selection of the "Next" button 845 to proceed with configuring the dedicated server. In some embodiments, the user can cancel the process of adding the dedicated server by selecting the "Cancel" button 850.

In some embodiments, when the user selects the next button 845, the user is presented with a dialog window that inquires whether to proceed with provisioning the dedicated server. The dialog window may list the configuration settings (e.g., selected hardware, image, datacenter, etc.) for the dedicated server. The dialog window may also list hosting plan details (e.g., contract related, pricing, etc). In some embodiments, the dialog window includes an "accept" button to confirm the provisioning request and "cancel" button to cancel the request.

Figure 9A:
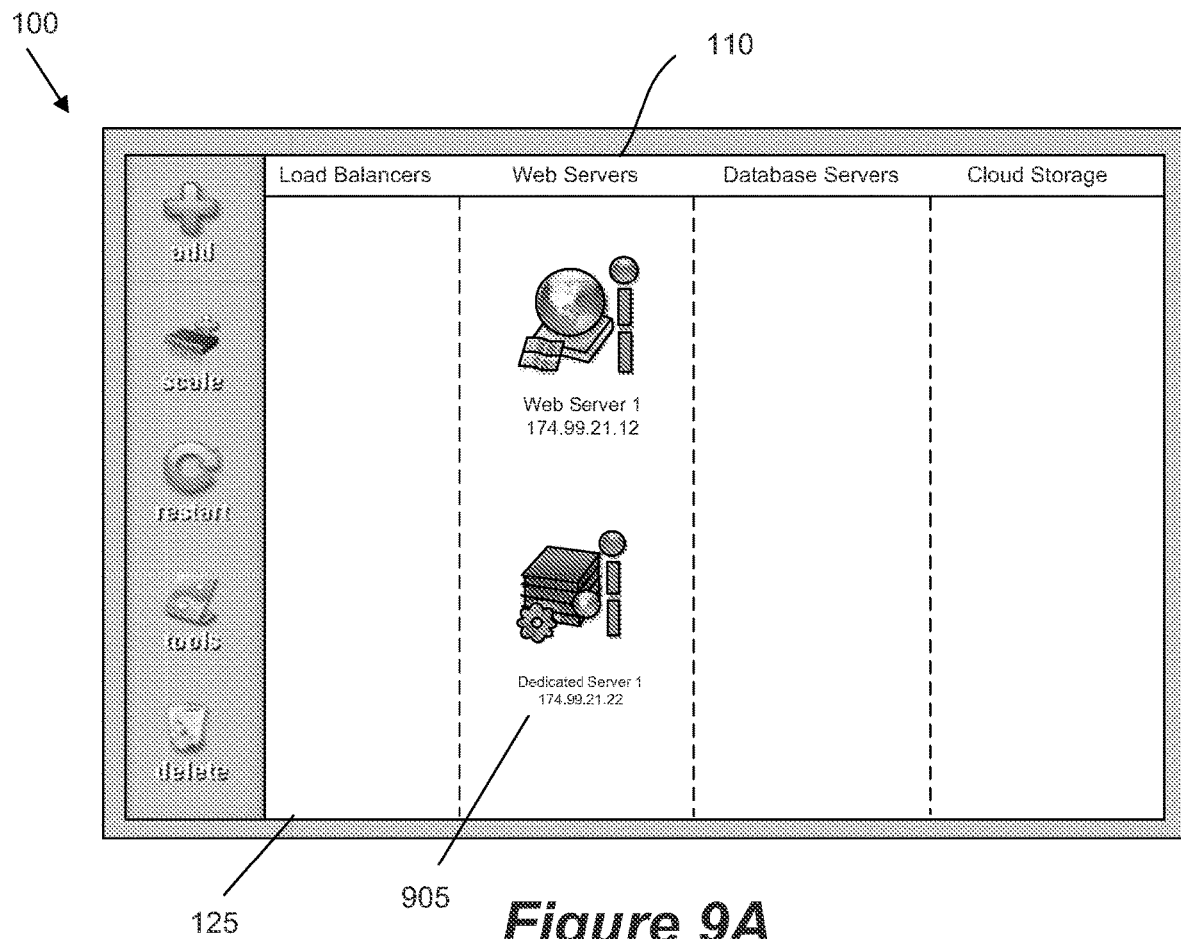
FIG. 9A illustrates the multi-server control panel displaying a dedicated server representation.

FIG. 9A illustrates the display area 125 of the multi-server control panel 100 after the user selects an image containing an operating system from the image selection window 800 and selects the "Next" button 845 on this form. The selection of the "Next" button 845 causes the front-end logic to define the dedicated server to add a graphical representation 905 of this dedicated server to the web server tier 110 that is displayed in the display area 125. Alternatively, some embodiments include a commit button. Once the user has specified the dedicated server configuration, the user can select this commit button (e.g., can click on this button) to direct the back-end deployment manager to deploy the dedicated server configuration. Once a user has specified a configuration, the hosting system identifies the specified datacenter location and deploys the dedicated server in real-time at the identified location. Several examples of automatically deploying the dedicated server will be described below by reference to FIGS. 12-17.

Figure 9B:
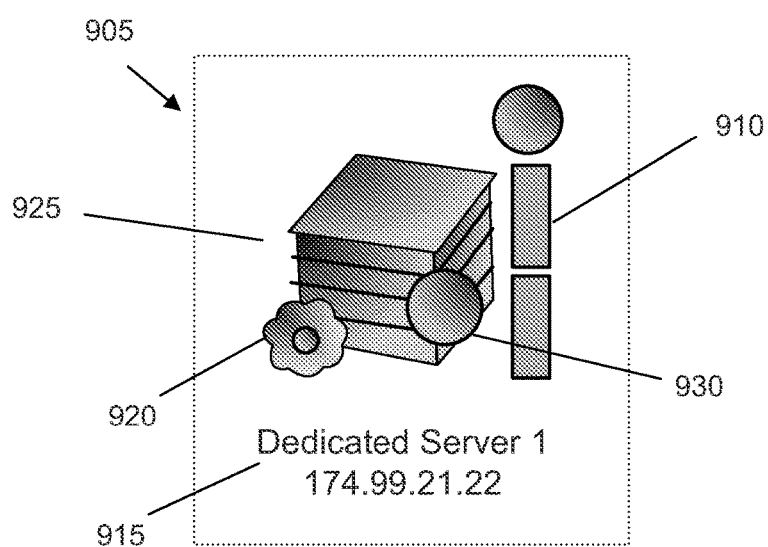
FIG. 9B provides a close-up view of the dedicated server representation.

FIG. 9B provides a close-up view of an example dedicated server representation of the multi-server control panel 100. In this example, the dedicated server representation 905 has a textual element 915 and a graphical element 925. The textual element 915 identifies the dedicated server as "Dedicated server 1". The textual element 915 of some embodiments identifies the dedicated server by a specified hostname. For instance, if the user specifies the hostname (e.g., "www.abc.com") through the name field 425 of the cloud server form 400, then the display area might display the specified name. In the example illustrated in FIG. 9B, the textual element includes an IP address of the dedicated server.

The graphical element 925 includes a dedicated server icon 920 and a resource meter 910. The dedicated server icon 920 is a graphical representation of the dedicated server. In some embodiments, the dedicated server icon 920 provides an indication of the operating system installed on the dedicated server. For instance, if the user selects an operating system image that includes a particular Windows operating system, the dedicated server icon 920 may display a representation of the particular operating system. As shown in FIG. 9B, the dedicated server icon 920 displays an indication that the operating system selected for the dedicated server is a Linux distribution.

The resource meter 910 is a meter that displays usage of several resources (e.g., CPU and memory) in real-time. In the example illustrated in FIG. 9B, the top resource meter represents CPU usage, and the bottom resource meter represent memory usage. Each meter displays the real-time usage by fluctuating (e.g., moving a bar within the meter) in accord with the real-time usage of the corresponding server. In some embodiments, the fluctuating graphical display is indicative of usage of the resource at different instances in time and/or is indicative of real-time or near-real time usage of the resource.

Also, the fluctuating graphical display changes color in some embodiments when the usage of the particular resource exceeds a particular threshold. For instance, in some embodiments, the bar within a meter changes color when resource usage goes over a predetermined threshold for the resource. One such example is when the memory usage goes over a 50 percent allotted memory capacity, the bottom resource meter might change from one color to another color (e.g., green to yellow).

The threshold in some embodiments is an expected usage rate over duration of time based on the amount of a particular resource that is assigned to the particular user. Hence, the top and bottom meters can indicate different colors at different instances in time to specify excess usage of the resource. These fluctuating display and the changing colors provide a quick visual indication of the CPU and memory being overloaded or "thrashed." Hence, these icons are referred to as "thrash-o-meters" in some embodiments. Instead of or in conjunction with CPU and memory, some embodiments of the multi-server control panel provide real-time usage of other resources. These other resources include network resources (e.g., network traffic, data transfer) and other physical resources (e.g., storage space).

II. Architecture

Figure 10:
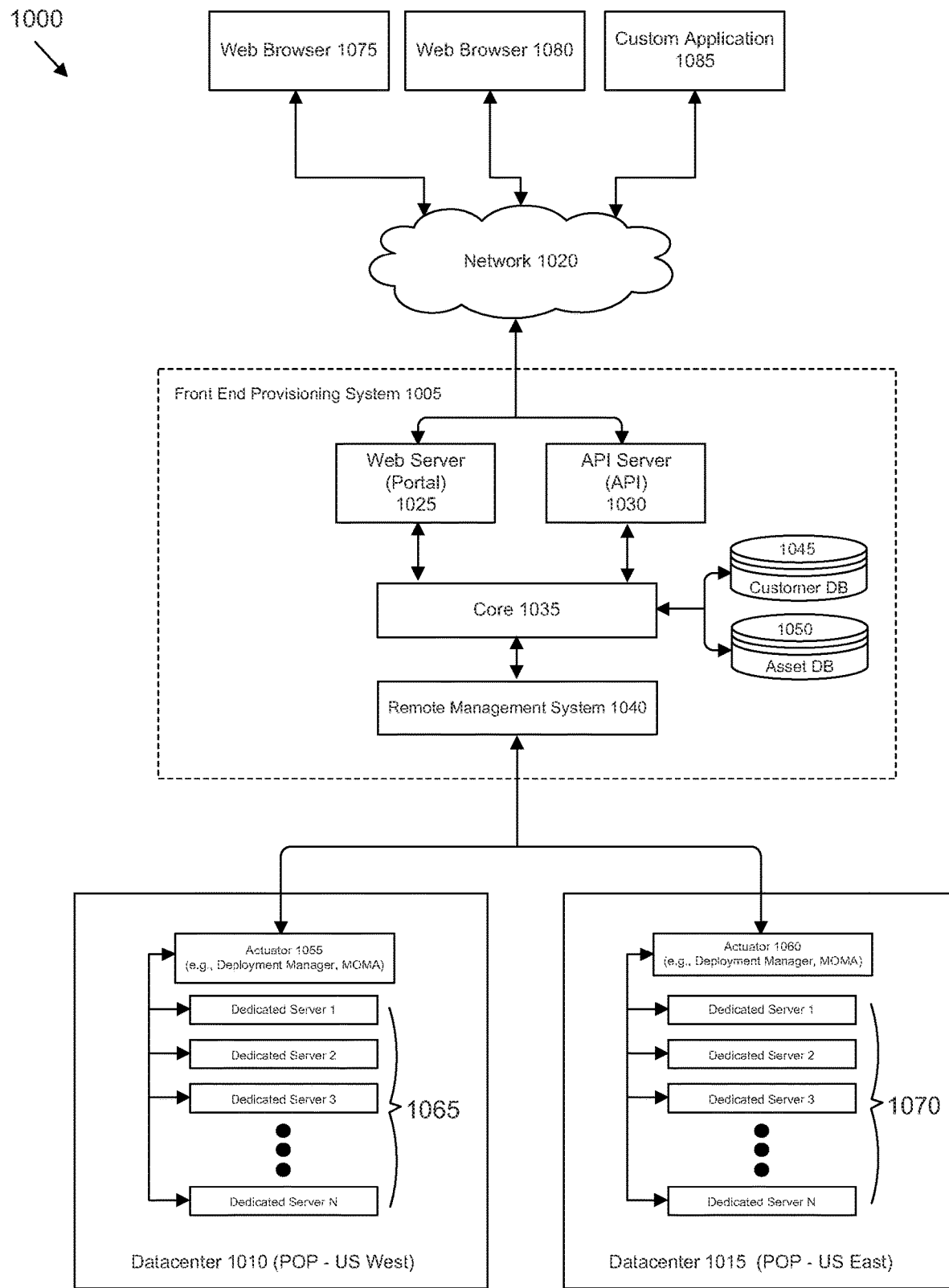
FIG. 10 illustrates a hosting system that implements some embodiments of the invention.

FIG. 10 illustrates a hosting system 1000 that implements some embodiments of the invention. This system provides automated reception of server configurations (e.g., for dedicated servers, virtual servers, etc.) through front-end user interface (UI) logic, and automated deployment of server configurations through back-end logic. The system may also receive different provisioning tasks (e.g., restart request, shutdown request, scale request) through the front-end UI and fulfills these tasks through the back-end logic. In some embodiments, the back-end logic is implemented using one or more actuators that operate at a particular datacenter. As shown in FIG. 10, the hosting system 1000 includes a front-end provisioning system 1005 that is communicatively coupled to datacenters 1010 and 1015 through actuators 1055 and 1060.

The front-end provisioning system 1005 (1) receives communications (e.g., service requests) from external users through a network 1010 and (2) routes the communications to different datacenters (e.g., datacenters 1010 and 1015). In the example illustrated in FIG. 10, the front-end provisioning system 1005 includes a web server 1025, an application programming interface (API) server 1030, a core 1035, and a remote management system 1040.

The web server 1025 communicates to a user through a network 1020 such as the Internet. Specifically, the user accesses the hosting system 1000 through the web browser 1075 or 1080 which may be executed on the user's desktop computer, portable notebook computer, personal digital assistant (PDAs), digital cellular telephone, or other electronic communication devices. For instance, when the user logs onto the hosting service's website or portal, the user may be presented with the multi-server control panel as discussed above by reference to FIG. 1.

In some embodiments, the web-server is responsible for generating a graphical interface through which users specify graphical representations (e.g., the multi-server control described in Section I above) for various server configurations. In conjunction with or instead of the web server, some embodiments implement the API server 1030 that interfaces with different custom applications (e.g., a custom application UI 1085) through the network 1020. The custom applications may operate on different operating systems or communication devices. In some embodiments, the custom application may be a program or an applet that executes in a web browser.

Figure 11:
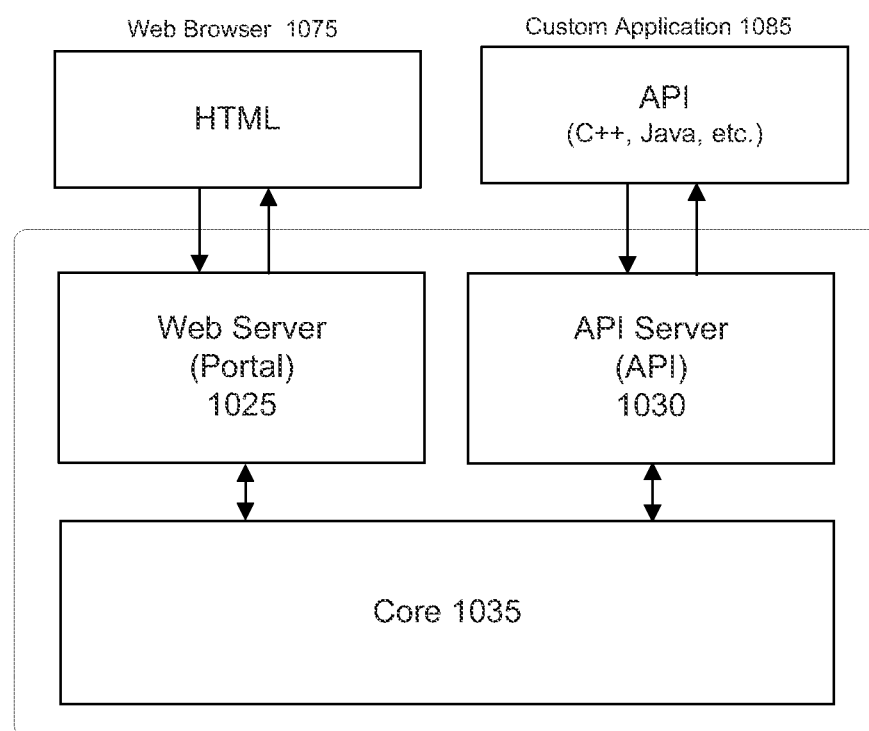
FIG. 11 conceptually illustrates the ability of the front-end provisioning system to interface with different types of applications.

FIG. 11 conceptually illustrates the ability of the front-end provisioning system 1005 to interface with different applications. Specifically, this figure illustrates that the front-end provisioning system can interface with either a thin client, such as the web browser 1085, or the custom application 1085 through the web server 1025 or API server 1030. As shown in the figure, the web server 1025 sends markup data (e.g., HTML) that is parsed and rendered as a web page on the web browser 1075. The user interacts with the web page to send different requests (e.g., HTTP requests) to the web server 1025.

In the example illustrated in FIG. 11, the custom application 1085 interfaces with the front-end provisioning system 1005 through the API server 1030. The custom application 1085 may be written in different programming languages (e.g., JAVA, C#, C++, etc). In some embodiments, the API server 1030 is implemented based on an HTTP based API. For instance, the API server may be implemented as a web service using a Representational State Transfer (REST) API. When a request is received through either the web server 1025 or the custom application 1030, the request is passed along to the core 1035 to be processed.

In some embodiments, the core 1035 acts as a controller that contains the executable code or logic required to perform different operations related to the multi-server control panel. These operations may include operations related to creating user accounts, enforcing access privileges (e.g., authenticating and authorizing a user), billing, monitoring resources, etc. For instance, on an initial communication, the web server may pass the user communication to the core for user verification and authentication. Accordingly, the core may receive identification information from the user and determine whether the user has already created an account with the system. Also, the core 1035 may authenticate and authorize the user based on data stored in the customer database 1045. In addition, the core may utilize an asset database 1050 to track available resources (e.g., hardware resources). In some embodiments, the core 1035 interacts with the remote management system 1040 to facilitate management of servers (e.g., virtual servers, dedicated servers) at different datacenters.

The remote management system 1040 receives different requests (e.g., provisioning tasks, restart request) from the core 1035 and routes these requests to the back-end provisioning system. In some embodiments, the remote management system 1040 (1) receives a change request from the core 1035, (2) identifies a particular actuator that can fulfill the change request, and (3) sends a message to the particular actuator. The remote management system 1040 may also identify a datacenter location from the change request. For instance, the remote management system 1040 may receive a request for a virtual server at a datacenter located in eastern United States. The remote management system 1040 may then send a message to an actuator that deploys virtual severs at the datacenter location.

The remote management system 1040 may serialize a message or data structure into a format that is understandable by an actuator (e.g., a deployment manager) that operates at a particular datacenter. In some embodiments, the serialization allows objects or data structures containing information to be sent and understood by different parts or modules of the provisioning system (e.g., the front-end provisioning system, the back-end provisioning system). For instance, different modules of the provisioning system that are defined by different programming languages (e.g., C++, Java, etc.) may interoperate by exchanging messages that are serialized.

An actuator (e.g., 1055 or 1060) is a component of the back-end system that receives a request (e.g., provisioning task) and translates the request to control or manage hardware resources such as dedicated machines, storage area networks, etc. Each datacenter location (e.g., datacenter 1010 or 1015) may have one or more actuators for different tasks. For instance, a datacenter may have one actuator that deploys dedicated machines and another actuator that deploys virtual machines. The datacenters may also have one or more other actuators to monitor or control (e.g., restart, shutdown) hardware resources. In the example illustrated in FIG. 10, the actuator 1055 interfaces with one set of dedicated servers 1065 at the datacenter 1010, while the actuator 1060 interfaces with another set of dedicated servers 1070 at the datacenter 1015. However, depending on a particular task, a particular actuator at a particular datacenter may communicate with other hardware (e.g., grid of shared hardware nodes, storage area network).

Having described the example architectural components of the hosting system 1000, several operations will now be described in Sections III and IV below. Specifically, Section III describes example operations performed by the system 1000 to provision a dedicated server. Section IV describes several example operations performed by the system 1000 to control or restart a dedicated server.

III. Provisioning a Dedicated Server

Figure 12:
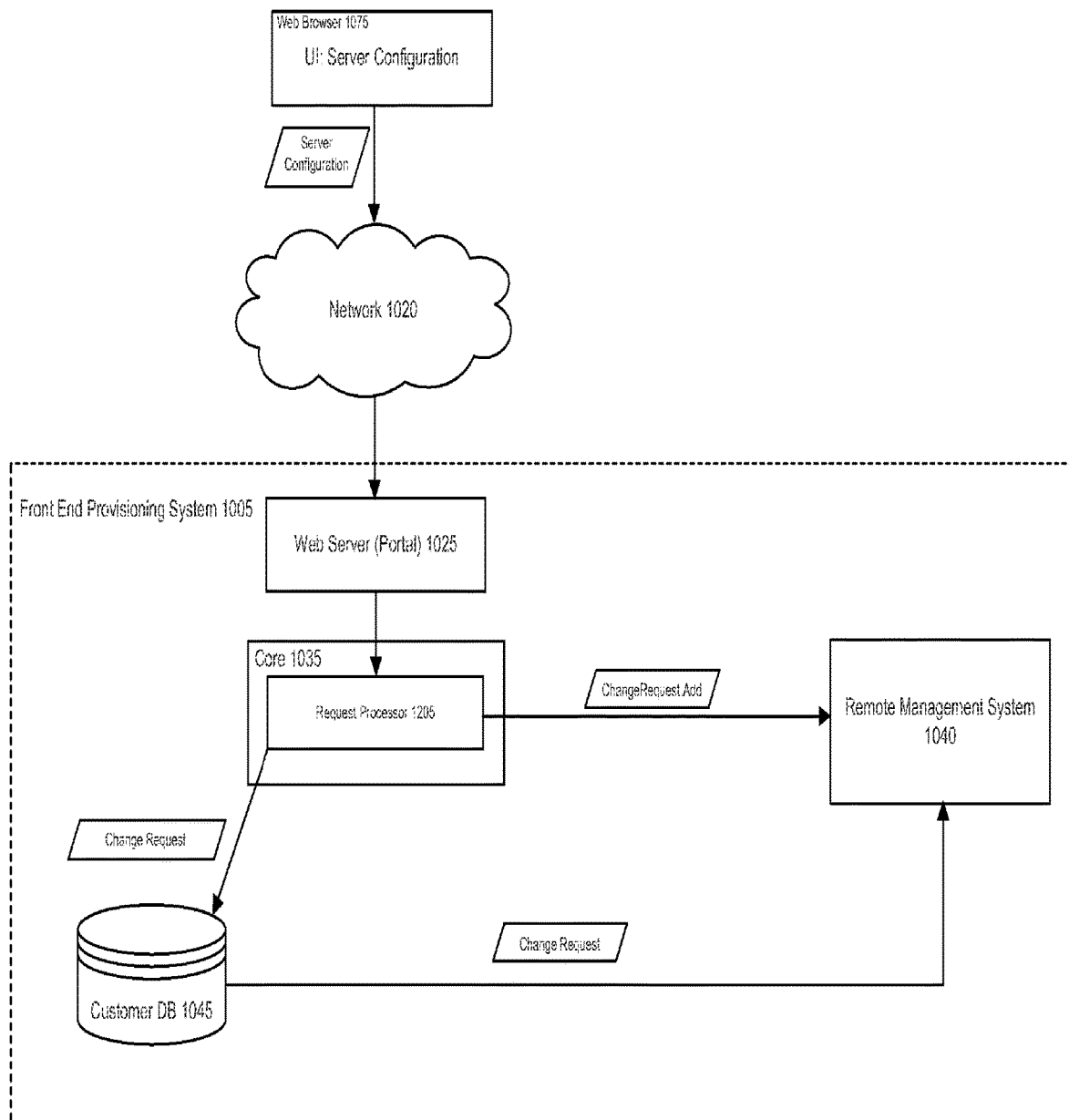
FIG. 12 illustrates example operations of the front-end provisioning system to provision a dedicated server.
Figure 13:
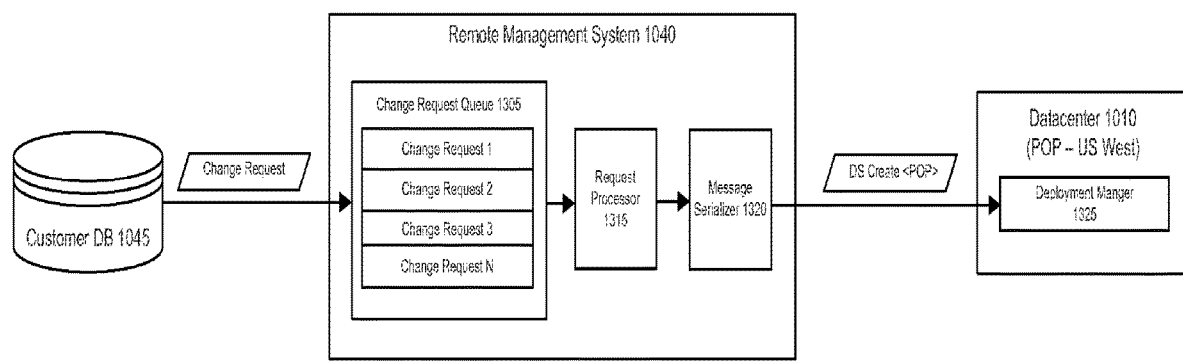
FIG. 13 conceptually illustrates several example operations performed by the remote management system to provision the dedicated server.
Figure 14:
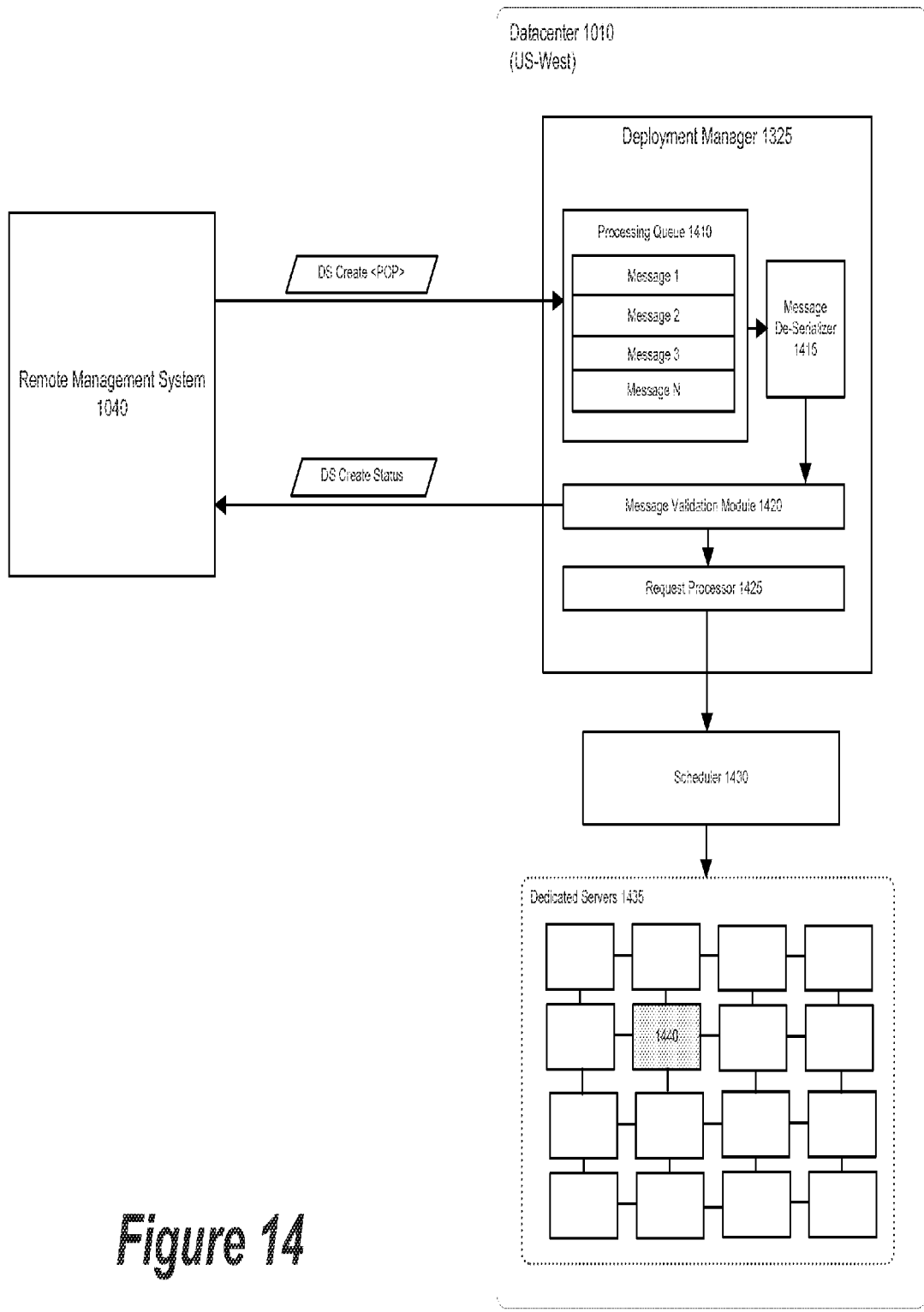
FIG. 14 illustrates example operations of the back-end provisioning system.
Figure 15:
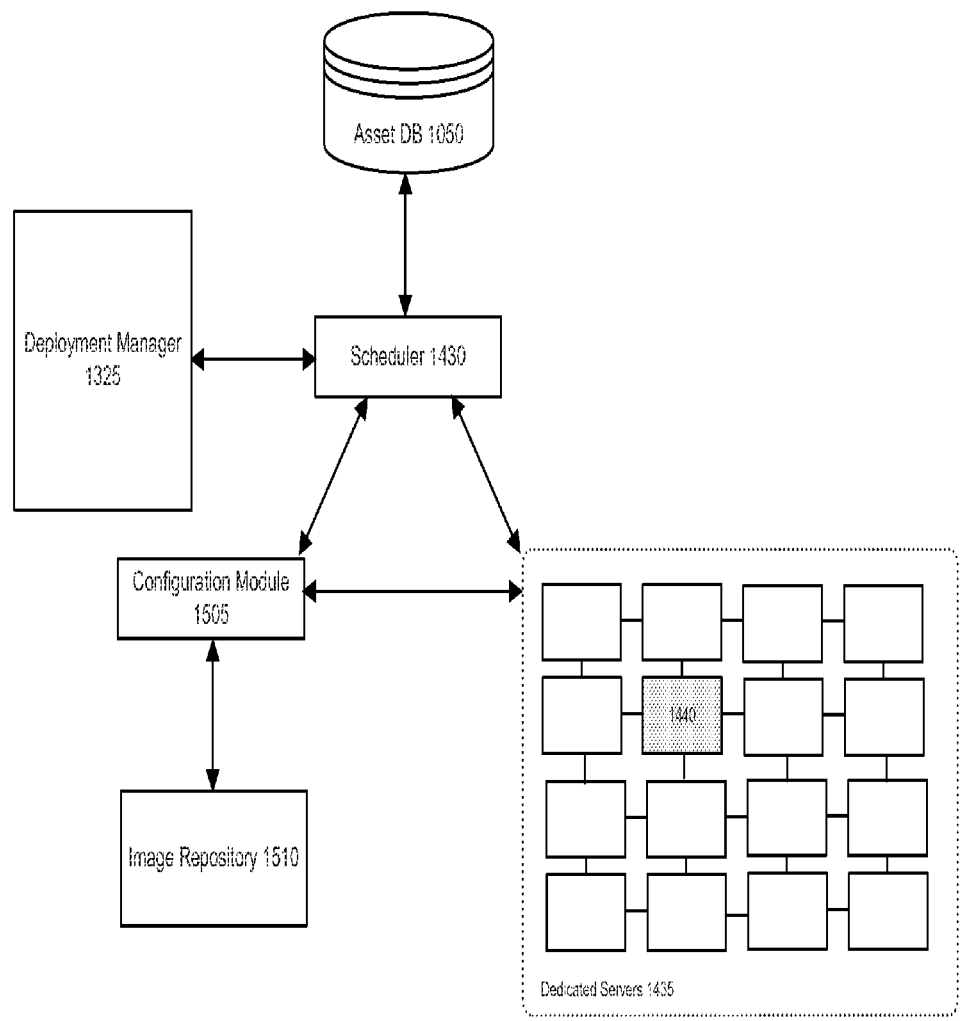
FIG. 15 illustrates several example operations performed by a scheduler to deploy the dedicated server.

FIGS. 12-15 illustrate example operations performed by the hosting system to provision a dedicated server. Specifically, FIGS. 12-13 illustrate how a server configuration that is received through the multi-server control panel is processed by the front-end provisioning system and routed to the back-end system. FIGS. 14-15 illustrate the interworks of the back-end system to automatically deploy the server configuration on an available dedicated server.

FIG. 12 illustrates example operations of the front-end provisioning system. In particular, this figure illustrates the core 1035 (1) receiving a server configuration from the multi-server control panel and (2) creating a change request to be processed by the remote management system 1040. In some embodiments, the server configuration is received through a user interacting with the multi-server control panel that is displayed in the web browser 1075. The user may have specified the server configuration after creating a user account and logging onto it. Examples of specifying a server configuration for a dedicated server are described above by reference to FIGS. 6-9.

As shown in FIG. 12, the server configuration is initially processed by the web browser 1075 and sent over the network 1020 to the web server 1025. The web server 1025 receives the server configuration and passes the configuration to the core 1035. In some embodiments, the web server 1025 operates in conjunction with an application server to receive and route the server configuration to the core 1035.

In some embodiments, when a new server configuration is received, the core 1035 (1) creates a change request and (2) stores the change request in the customer database 1045. This is illustrated in FIG. 12 with the request processor 1205 of the core 1035 receiving the server configuration and creating a change request that is stored in the customer database 1045. In some embodiments, the change request contains all the necessary information to fulfill the provisioning task. The change request may include information extracted or derived from the server configuration request. The information may include machine specification (e.g., CPU, memory, storage), image specification (e.g., operating system, applications on the operating system), network specification (e.g., IP address), datacenter location, customer information (e.g., customer ID), etc. The core 1035 may also create the change request by accessing customer data or resource data in one or more data stores (e.g., the customer database 1045).

In some embodiments, the change request or change request entity stored in the customer database may include a status identifier or an attribute field that indicates the status of the change request. For example, when the dedicated server is provisioned according to the received server configuration, the core 1035 may receive a change request status message indicating that the provisioning task has been completed. The core 1035 may then update the status identifier of the change request to reflect the completion of the provisioning task.

As shown in FIG. 12, once the change request is created and stored in the customer database 1045, the core 1035 sends a message to the remote management system 1040 indicating that a new change request has been added to the customer database 1045. This causes the remote management system 1040 to retrieve the change request from the customer database 1045. In the example illustrated in FIG. 12, the core 1035 sends a message ("ChangeRequest.Add") that causes the remote management system 1040 to access the customer database 1045. Alternatively, in some embodiments, the remote management 1040 receives the change request directly from the core 1035 without having to access the customer database 1045.

FIG. 13 conceptually illustrates several example operations performed by the remote management system 1040. As shown, the remote management system 1040 (1) retrieves the change request from the customer database 1045, (2) translates the change request to a provision or create request, and (3) sends the provision request to an appropriate actuator that can fulfill the change request. As shown in FIG. 13, the remote management system 1040 retrieves the change request from the customer database 1045 and stores the request in a change request queue 1305.

The change request queue 1305 may contain different types of requests. For instance, the change request queue 1305 may have a request for a virtual server, cloud storage, load balancer, etc. When the change request is ready to be processed, the remote management system 1040 retrieves the change request from the change request queue 1305 and begins processing the change request. For instance, a request processor 1315 may determine that the request is ready to be processed and pop the request from the queue 1305, as illustrated in FIG. 13. If the message is serialized, the remote management system 1040 may first de-serialize the change request to extract information contained in the change request.

After retrieving the change request from the queue 1305, the remote management system 1040 translates the change request to a create message. In some embodiments, the request processor 1315 translates the change request by identifying several pieces of information related to the server configuration. As mentioned above, the server configuration may include customer identification, machine specification, image specification, and network details. When dedicated servers are hosted on multiple datacenters, the request processor 1315 may also identify a location of the datacenter (e.g., U.S. West).

As shown FIG. 13, the remote management system 1040 includes a message serializer 1320 for serializing the configuration information. In some embodiments, the message serializer 1320 serializes a message so that a particular actuator operating at a particular datacenter can under the message. For instance, in FIG. 13, the message serializer 1320 serializes the create message into a format that is understandable by a deployment manager 1325 at the datacenter 1010.

As shown in FIG. 13, the remote management system 1040 creates a create message based on the change request and sends the create message to the datacenter 1010. Specifically, the remote management system 1040 sends the create message based on the datacenter location specified by the user through the multi-server control panel. In some embodiments, the provision request is sent to an appropriate actuator operating at a datacenter that can fulfill the request.

For instance, the remote management system 1040 may identify from the change request that the create message should be sent to the deployment manager 1325 at the datacenter location "US-West" 1010, as illustrated in FIG. 13.

FIG. 14 illustrates example operations of the back-end provisioning system. In particular, this figure illustrates how an actuator (i.e., the deployment manager 1325) (1) receives the create message, (2) validates the message, and (3) interoperates with a scheduler 1430 to provision a dedicated server 1440. To facilitate these operations the deployment manager 1325 of some embodiments includes a processing queue 1410 for storing request messages, a message de-serializer 1415 for de-serializing the messages, a message validation module 1420 for validating the messages, and a request processor 1425 for processing the messages.

In the example illustrated in FIG. 14, the deployment manager 1325 listens for requests (e.g., create messages) and stores the requests in the processing queue 1410. When the create message is ready to be processed, the deployment manager 1325 may pop the message from the queue 1410 and start processing the message. However, if the message is serialized, the deployment manager 1325 may first de-serialize the message to extract information contained in the message. This is illustrated in FIG. 14 as the message de-serializer 1415 receives the create message from the queue 1410 and de-serializes the message.

Once the provision request is retrieved, the deployment manager 1325 of some embodiments performs a validation operation. To perform the validation, the deployment manager 1325 determines whether the create request from the remote management system 1040 includes enough information to fulfill the provision request. For instance, the deployment manager 1325 may make this determination based on the customer identification, machine specification, image specification, and network details.

In some embodiments, the deployment manager 1325 may send a create request status back to the remote management system 1040 (e.g., through the message validation module 1420) that indicates whether the validation has passed or failed, as illustrated in FIG. 14. In some embodiments, the status of the create request is forwarded from the remote management system 1040 to the multi-server control panel. The multi-server control panel may then display a graphical and/or textual element indicating that the request sent through the control panel is being processed or has failed. For instance, when the multi-server control panel receives the status update, it may display a graphical or textual representation indicating that the dedicated server will be configured and deployed on a dedicated server at the specified datacenter.

As shown in FIG. 14, after validating the provision request message, the deployment manager 1325 communicates with the scheduler 1430. Specifically, the deployment manager interfaces with the scheduler to schedule and deploy the configuration on the dedicated server 1440 that is in a pool of dedicated servers 1435.

To configure and deploy the server configuration on the dedicated server 1440, the scheduler 1430 performs a number of different operations. FIG. 15 illustrates several example operations performed by the scheduler to deploy the dedicated server. Specifically, this figure illustrates the scheduler interfacing with the asset database 1050 and a configuration module 1505 to (1) select a dedicated server node (i.e., the dedicated server 1440) from the pool of dedicated servers 1435 and (2) configure the server node according the specifications (e.g., network, image) received through the multi-server control panel.

In the example illustrated in FIG. 15, the scheduler 1430 receives a deployment request from the deployment manager. In some embodiments, the scheduler 1430 initially accesses the asset database 1050 to identify a dedicated machine to deploy the server configuration. The scheduler 1430 may make this identification based on the machine specification in the deployment request.

In some embodiments, the asset database 1050 tracks different information related to dedicated machines and/or shared hardware nodes. For instance, the asset database 1050 may include information that indicates available hardware resources in a particular datacenter. The asset database 1050 may also indicate what the machine specifications are on those hardware resources. As will be described below by reference to FIG. 18, the asset database 1050 may also include information related to the owner of the hardware resource and the power distribution unit (PDU) that provides power to the hardware resource.

As shown in FIG. 15, the scheduler 1430 accesses the asset database 1050 to determine one or more dedicated servers that meets the machine specification. In some embodiments, the scheduler 1430 identifies dedicated servers that meet the hardware specification and are available to be provisioned. For example, the scheduler 1430 may identify a list of candidate dedicated servers from all available servers by matching the machine specification (e.g., memory capacity, number of memory, storage capacity, number of storages, number of processors or cores, processor speed, manufacturer of hardware, etc.) with data stored in the asset database 1050.

When the scheduler 1430 identifies an available dedicated server, it may lock the dedicated server for the purpose of provisioning. For instance, the scheduler 1430 may select and lock one particular dedicated server from a group of available dedicated severs. In some embodiments, the locking entails preventing another scheduler from provisioning the same dedicated server. Once the dedicated server is marked as locked, the scheduler 1430 of some embodiments interfaces with the configuration module 1505, as illustrated in FIG. 14.

In some embodiments, the configuration module 1505 performs several different operations to place a dedicated server in operational state. Several examples operations include (1) preparing the dedicated server's file system, (2) installing an operating system, (3) configuring security settings, and (4) configuring network settings. To prepare the file system, the configuration module 1505 may partition the server's drive and/or format the drive. For instance, the configuration module 1505 may initially partition the drive into several different logical partitions and then format the drive to install the operating system.

As shown in FIG. 14, the configuration module 1505 accesses an image repository 1510. In some embodiments, the image repository 1510 is a library that contains links to actual images that can be used to set up different servers. For instance, when the configuration module 1505 receives a request specifying a Windows operating system and a particular application server, then the configuration module 1505 might access the image repository 1510 to locate an image having the specified operating system and application. As mentioned above by reference to FIG. 8, the image repository may include images provided by the hosting service and other users (e.g., customers, general public, etc).

The configuration module 1505 may also define security settings for the dedicated server. For example, the configuration module 1505 may set up session security such as username and password, SSH key, host key, etc. In some embodiments, the configuration module 1505 configures network setting such as IP address, virtual local area network (VLAN), etc. Once the dedicated server is provisioned, the status of the provisioning request may be sent back to the multi-server control panel. For instance, a status report may be displayed on the multi-server control panel that indicates to the user that the dedicated server meeting the specifications has been provisioned. The status report may also include any security contracts configured during the provisioning process.

Figure 16:
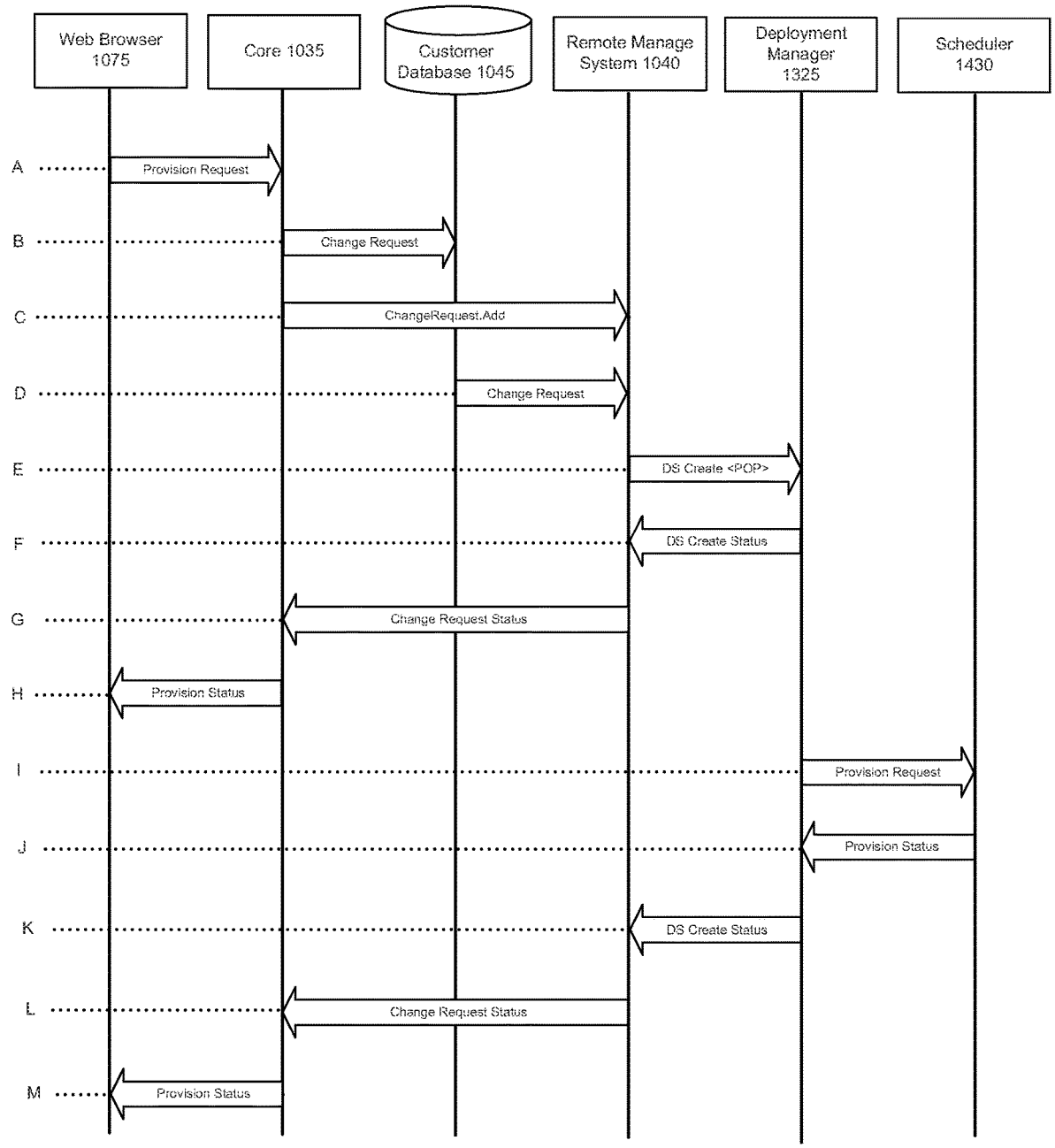
FIG. 16 is a messaging flow diagram that illustrates several example messages exchanged between components of the hosting system to provision a dedicated server.

FIG. 16 is a messaging flow diagram that illustrates several example messages exchanged between components of the hosting system to provision a dedicated server. As shown in FIG. 16, the sequence begins (at A) with the web browser 1075 sending a provision request to the core 1035. Several examples of specifying a server configuration are described above by reference to FIGS. 6-9.

The core 1035 translates (at B) the provision request to a change request and stores the change request in the customer database 1045. The core 1035 sends (at C) a message to the remote management system 1040 indicating that a new change request has been added to the customer database 1045. Example operations performed by the core 1035 to create and store the change request are described above by reference to FIG. 12.

The remote management system 1040 retrieves (at D) the change request from the customer database 1045. The remote management (at E) sends a create message to the deployment manager 1325. In some embodiments, the create message includes a location of a particular datacenter. For instance, the particular datacenter may be "US East 1", which represents a datacenter located in the eastern portion of the United States, or "US West 1", which represents a datacenter located in the western portion of the United States. Several examples operations performed by the remote management system 1040 to create and send the create message are described above by reference to FIG. 13.

The deployment manager 1325 sends (at F) a create request status to the remote management system 1040. In some embodiments, the create request status is returned after the deployment manager 1325 validates information contained in the create message. Examples of the deployment manger validating the change request and returning a create request status is described above by reference to FIG. 14.

The remote management system 1040 sends (at G) a change request status message to the core 1035. In some embodiments, the change request status is based on the create status received from the deployment manager 1325. The core 1035 sends (at H) an update on the status of the provision request to the web browser 1075. For instance, the multi-server control panel may display a graphical and/or textual element indicating that the request sent through the control panel is being processed or has failed. Also, when the multi-server control panel receives the status update, it may display a graphical or textual representation indicating that the dedicated server will be configured and deployed on a dedicated server at the specified datacenter.

The deployment manger 1325 sends (at I) a provision request to the scheduler 1430. In some embodiments, the scheduler 1430 selects a dedicated server from a grid of dedicated servers based on the provision request. For instance, the scheduler may access an asset database to determine whether one or more dedicated servers meet the machine specification as specified by the user of the multi-server control panel.

The scheduler 1430 returns (at J) a provision status to the deployment manager 1325. The provision status may indicate that the dedicated server has been provisioned or could not be provisioned. The deployment manager 1325 sends (at K) a create status message to the remote management system 1040. The remote management system 1040 sends (at L) a change request status message to the core 1035. The core 1035 sends (at M) an update on the status of the provision request to the web browser 1075. In some embodiments, the status report indicates to the user that the dedicated server that meets the specification has been provisioned. The status report may also include any security contracts or settings configured during the provisioning process.

Figure 17:
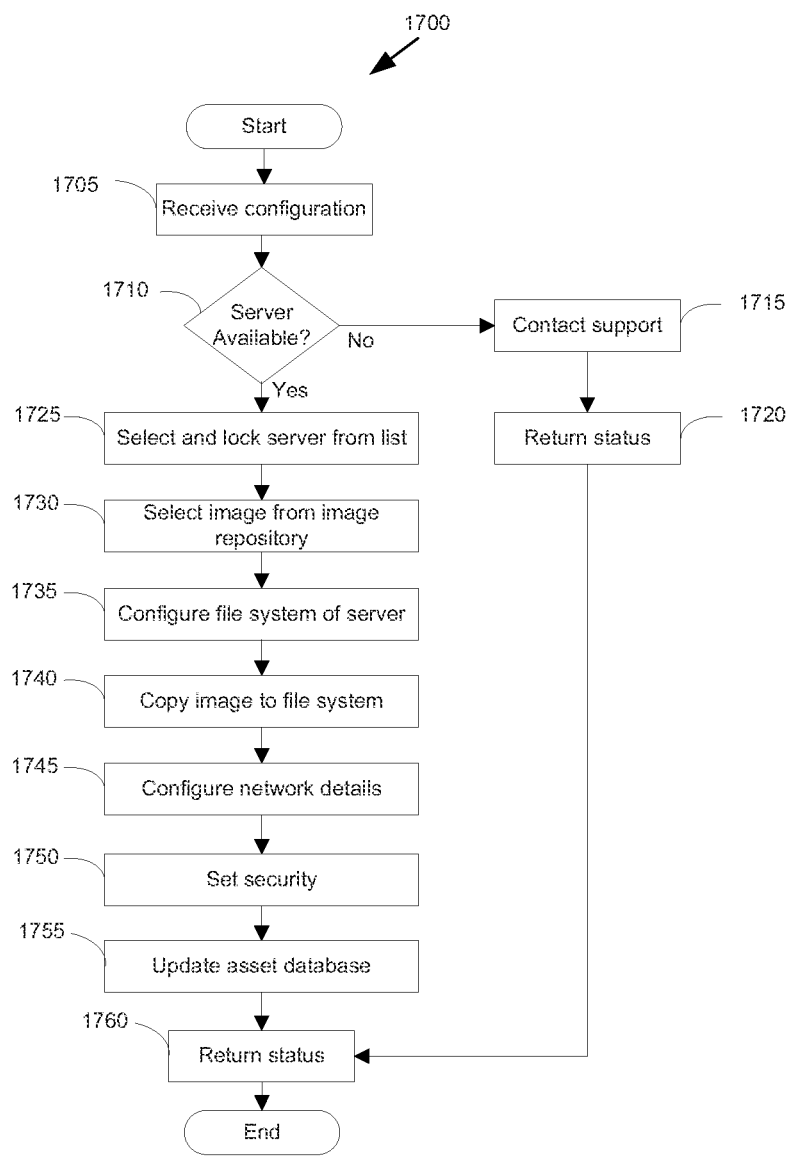
FIG. 17 conceptually illustrates a process for provisioning a dedicated server.

FIG. 17 conceptually illustrates a process 1700 for provisioning a dedicated server. In some embodiments, the process 1700 is performed by back-end logic of the hosting system. For instance, this process 1700 may be performed by a deployment manager (e.g., the deployment manager 1325) operating in conjunction with a scheduler (e.g., the scheduler 1430), and a configuration module (e.g., the configuration module 1505). The process 1700 starts when it receives (at 1705) a configuration for a dedicated server. In some embodiments, the configuration for the dedicated server is received through the multi-server control panel, as described above by reference to FIGS. 6-9.

The process 1700 determines (at 1710) whether there are any dedicated servers available to be provisioned. When there are no available servers, the process 1700 contacts (at 1715) support to indicate that no server meeting the hardware specifications is available at the datacenter requested by a user. In some embodiments, the process 1700 returns (at 1720) the status of the provisioning request. For instance, a status report may be reported back to the multi-server control panel to indicate to the user that no dedicated server that meets the specification is available at that datacenter.

In some embodiments, the availability of the server is determined by the front-end provisioning system. For instance, prior to receiving the configuration at the back-end provisioning system, the front-end provisioning system may determine and indicate to the user that dedicated servers are only available at a particular datacenter. The front-end provisioning system may make this determination by accessing a data store (e.g., the asset database 1050) that includes available servers at different datacenters.

When the determination is made that a server is available, the process 1700 selects and locks (at 1725) the server for the purpose of provisioning. For instance, process 1700 may select and lock one particular dedicated server when it finds multiple dedicated servers that meet the hardware specifications. In some embodiments, the locking prevents another deployment manager or scheduler from provisioning the same dedicated server.

Once the dedicated server is locked, the process 1700 selects (at 1730) an image from a library or repository of images. As mentioned above, the image may be selected based on the type of operating system (e.g., Windows, Linux). The image may also be selected based on a combination of the type of operating system and one or more applications installed on the operating system. For instance, when the configuration request specifies a Linux operating system and a particular application server (e.g., PHP server), then the process 1700 might access the image repository to select a particular image that includes the specified operating system and application.

Process 1700 then configures (at 1735) the file system of the selected server. The process 1700 configures the file system by formatting the server's drive. In addition, the process 1700 may configure the file system by partitioning the drive. Once the drive is formatted, process 1700 copies (at 1740) the selected image onto the formatted drive. After copying the image to the drive, the process 1700 configures (at 1745) network details such as IP address, subnet, domain naming server, etc.

The process 1700 then sets (at 1750) security for the server. For instance, the process 1700 may set up session security such as username and password, SSH key, host key, etc. Once the server is provisioned, the process 1700 updates (at 1755) the asset database. For instance, the process 1700 may update data related to the provisioned dedicated server by indicating the server is not available to be provisioned. The process 1700 returns (at 1760) the status of the provisioning request. For instance, a status report may be reported back to the multi-server control panel that indicates to the user that the dedicated server meeting the specifications has been provisioned. The status report may also include any security contracts or settings configured during the provisioning process.

IV. Cycling a Dedicated Server

Figure 18:
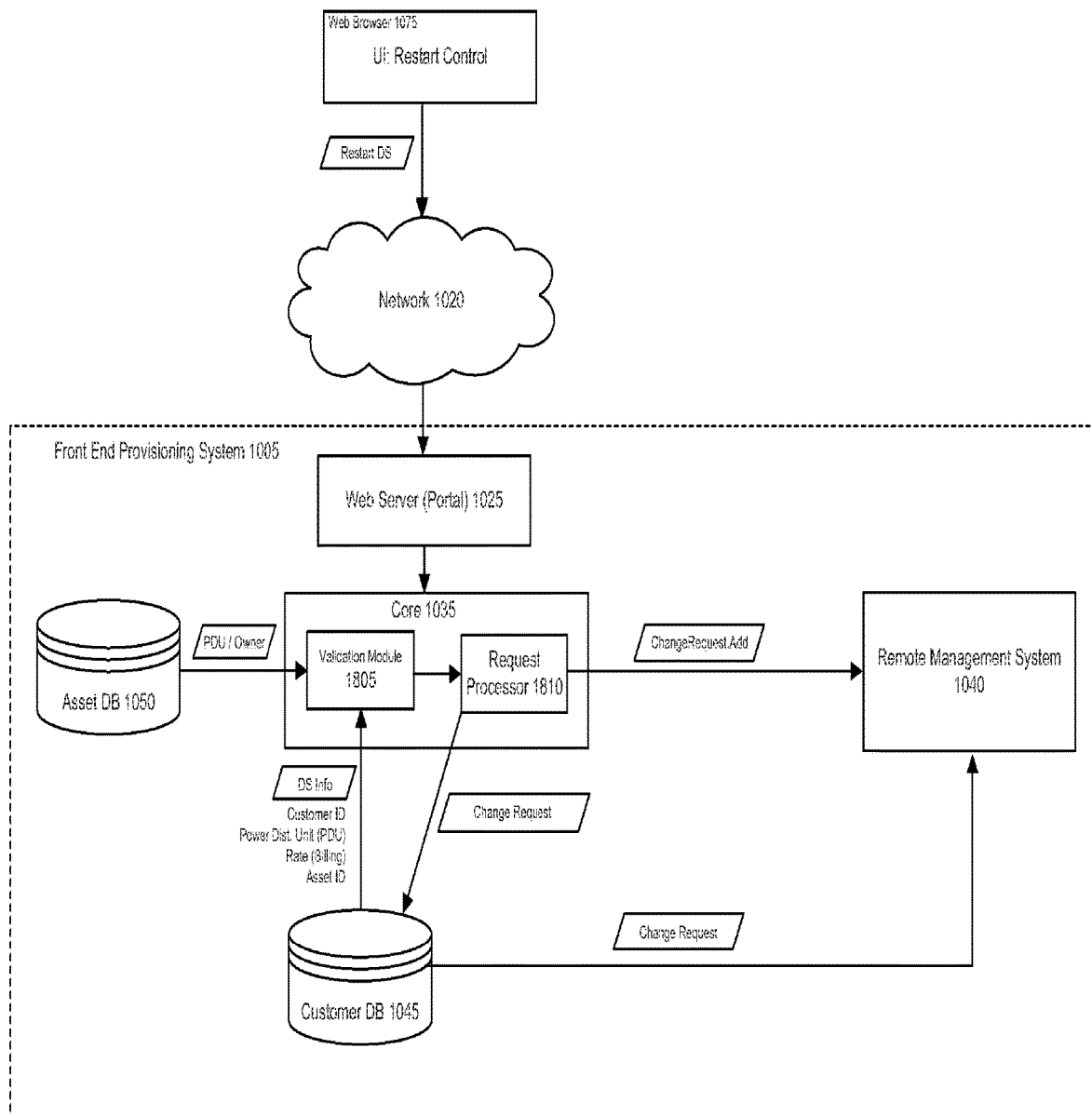
FIG. 18 illustrates example operations of the front-end provisioning system to restart a dedicated server.
Figure 19:
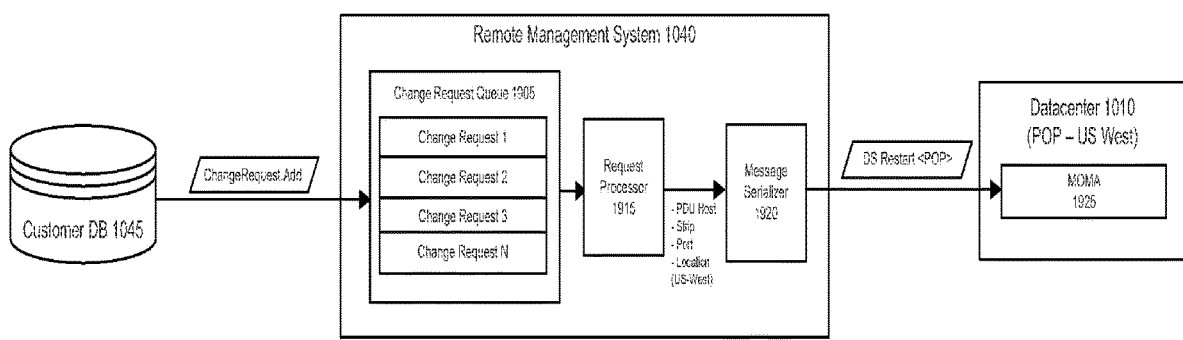
FIG. 19 conceptually illustrates several example operations performed by the remote management system to restart the dedicated server.
Figure 20:
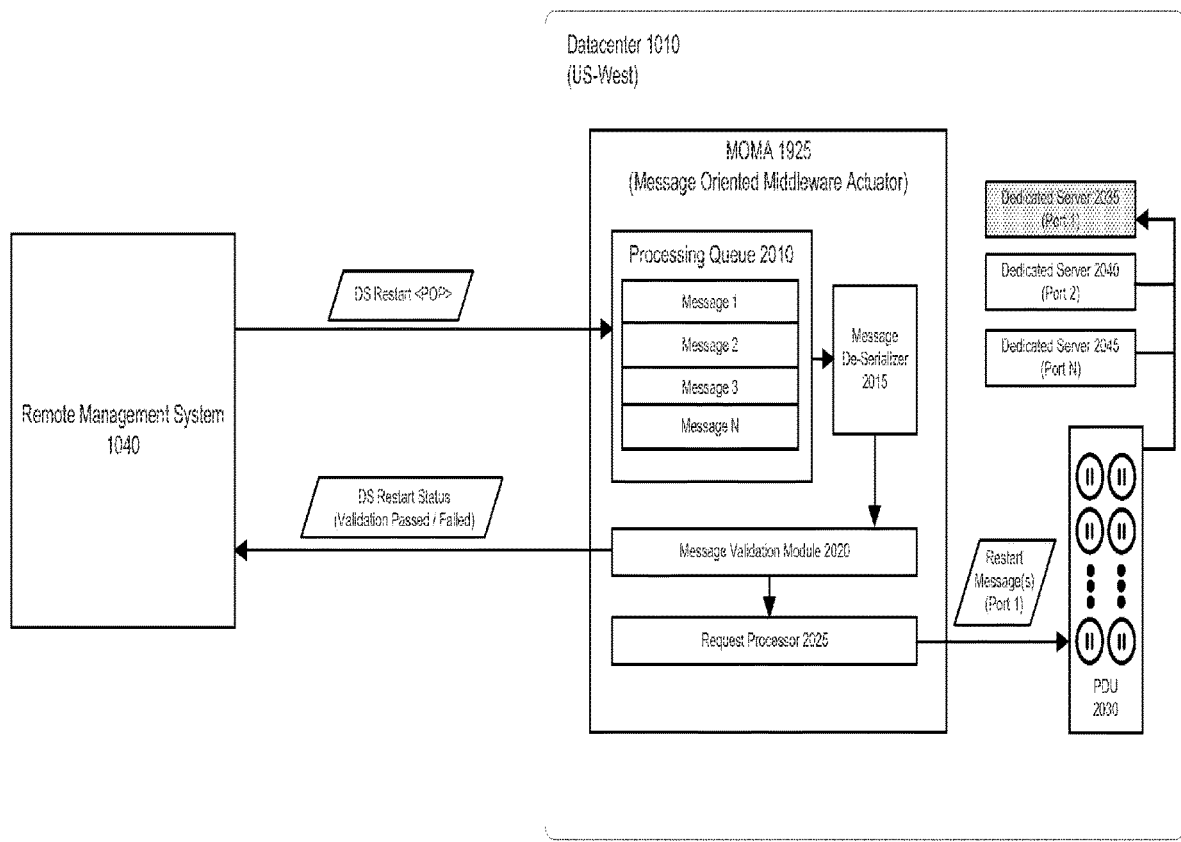
FIG. 20 illustrates example operations of the back-end provisioning system to restart the dedicated server.
Figure 21:
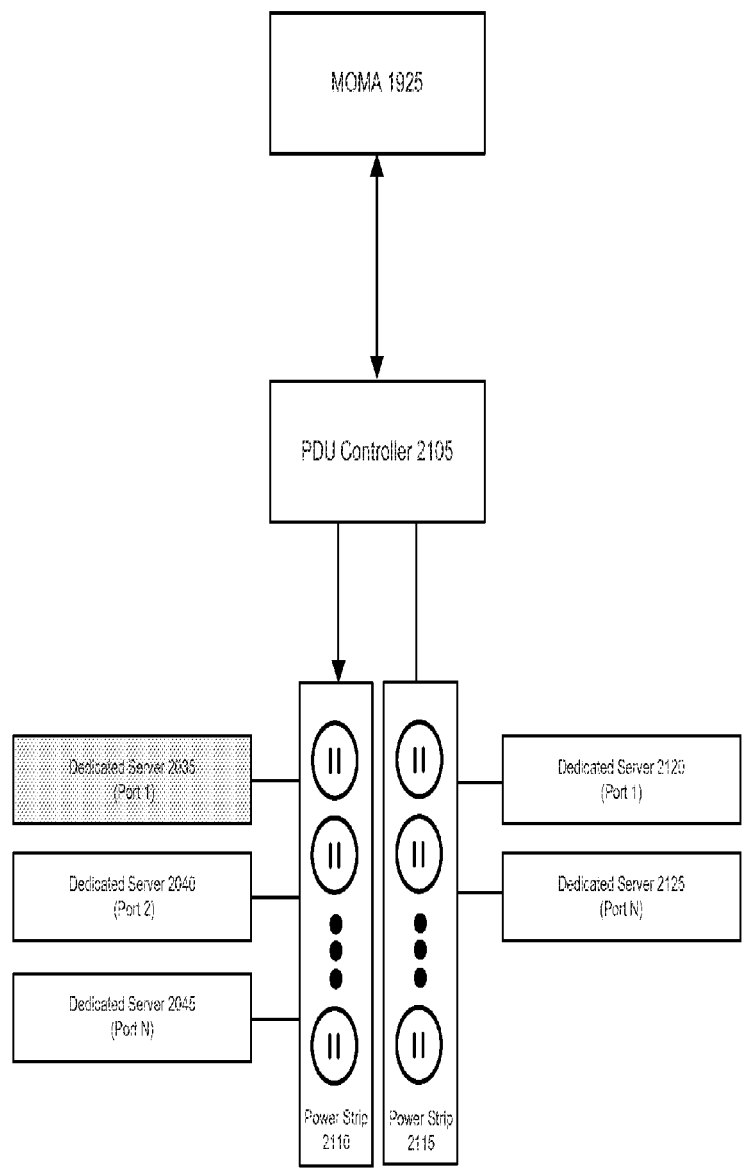
FIG. 21 illustrate example operations performed by a PDU controller to restart the dedicated server.

FIGS. 18-21 illustrate example operations performed by the hosting system to restart a dedicated server. Specifically, FIGS. 18-19 illustrate how a restart request that is received through the multi-server control panel is processed by the front-end provisioning system and routed to the back-end system. FIGS. 20-21 illustrate the interworks of the back-end system to automatically restart the dedicated server.

FIG. 18 illustrates example operations of the front-end provisioning system. In particular, this figure illustrates the core 1035 (1) receiving the restart request, (2) validating ownership of the dedicated server, and (3) creating a change request to be processed by the remote management system 1040. In some embodiments, the restart request is received through user interaction with the multi-server control panel that is displayed in the web browser 1075. The user may have initiated the restart request by selecting (e.g., through a cursor click operation, through a touch operation, etc.) a dedicated server representation and a restart control (e.g., UI button).

As shown in FIG. 18, the restart request is initially processed by the web browser and sent over the network 1020 to the web server 1025. The web server 1025 receives the restart request and passes the request to the core 1035. In some embodiments, the web server 1025 operates in conjunction with an application server to receive and pass the restart request to the core 1035.

In the example illustrated in FIG. 18, when the core 1035 receives a restart request, the core (1) validates the restart request, (2) creates a change request, and (3) stores the change request in the customer database 1045. In some embodiments, the validation operation performed by the core 1035 determines the ownership of the dedicated server. In other words, the validation operation determines whether the dedicated server that is to be restarted is owned by the user who requested the restart operation through the web browser 1075.

In some embodiments, the core 1035 validates ownership of the dedicated server by accessing data one or more data storages. This is illustrated in FIG. 18 as a validation module 1805 accesses data in both the customer database 1045 and the asset database 1050. In this example, the core 1035 initially retrieves dedicated server information from the customer database 1045. In some embodiments, the dedicated server information includes a customer identification (ID) and a power distribution unit (PDU) ID. In some embodiments, the PDU is a power strip that is physically connected to the dedicated server. The core may also retrieve PDU and ownership information from the asset database 1050. In some embodiments, the core 1035 retrieves an asset ID from the customer database 1045 and uses the asset ID to retrieve data from the asset database 1050.

Once the information is retrieved from the customer database 1045 and the asset database 1050, the core 1035 may compare the retrieved information to validate ownership of the dedicated server. For instance, the ownership might be validated when the PDU information and/or customer information from the databases 1045 and 1050 match. Alternatively or conjunctively, the core 1035 may access other data in the customer database 1045 to validate the ownership. For instance, the core 1035 may retrieve billing rate from the customer database 1045 and compare the rate with a rate associated with the dedicated server that is stored in the asset database 1045.

As shown in FIG. 15, the request processor 1810 of the core 1035 receives restart information from the validation module 1805 and creates a change request. In some embodiments, the change request contains all the necessary information to fulfill the restart task. For instance, the change request may include information related to the PDU such as the port or plug number that distributes power to the dedicated server. When there are multiple datacenters, the change request may also include the location information (e.g., U.S. west, U.S. east). The change request may include information extracted from the initial restart request. The change request may include information retrieved from or more data stores (e.g., the customer database 1045, the asset database 1050). For example, the PDU information (e.g., port number, datacenter location) may be retrieved from the asset database 1050.

As shown in FIG. 18, once the change request is created and stored in the customer database 1045, the core 1035 sends a message to the remote management system 1040 indicating that a new change request has been added to the customer database 1045. This causes the remote management system 1040 to retrieve the change request from the customer database 1045. In the example illustrated in FIG. 18, the core 1035 sends a message ("ChangeRequest.Add") that causes the remote management system 1040 to access the customer database 1045. Alternatively, in some embodiments, the remote management 1040 receives the change request directly from the core 1035 without having to access the customer database 1045.

FIG. 19 conceptually illustrates several example operations performed by the remote management system 1040. As shown, the remote management system 1040 (1) retrieves the change request from the customer database 1045, (2) translates the change request to a restart request, and (3) sends the restart request to an appropriate actuator that can fulfill the change request. In this example, the remote manage system 1040 includes a change request queue 1905 for storing change requests, a request processor 1915 for processing the change request, and a message serializer 1920 for serializing a restart request.

As shown in FIG. 19, the remote management system 1040 retrieves the change request from the customer database 1045 and stores the request in the change request queue 1905. The change request queue 1905 may contain different types of requests. For instance, the change request queue 1905 may have a request for a virtual server, cloud storage, load balancer, etc. When the change request is ready to be processed, the remote management system 1040 retrieves the change request from the change request queue 1905 and begins processing the change request. For instance, a request processor 1915 may determine that the request is ready to be processed and pop the request from the queue 1905, as illustrated in FIG. 19. If the message is serialized, the remote management system 1040 may first de-serialize the change request to extract information contained in the change request.

After retrieving the change request from the queue 1905, the remote management system 1920 translates the change request to a restart message. In some embodiments, the request processor 1915 translates the change request by identifying several pieces of information related to the PDU including the PDU host (e.g., 2-150.abc.com), the PDU, and the port or plug number to which the dedicated server is connected. When dedicated servers are hosted on multiple datacenters, the request processor 1915 may also identify a location of the datacenter (e.g., U. S. West).

After identifying one or more of these pieces of information, the request remote management system 1040 serializes the information into a format that is understandable by an actuator operating at a datacenter. In the example illustrated in FIG. 19, the remote management system 1040 includes the message serializer 1920 for serializing the identified information (e.g., PDU host, port, strip).

As shown in FIG. 19, the remote management system 1040 creates a restart message based on the change request and sends the restart message to the datacenter 1010. Specifically, the remote management system 1040 sends the restart message based on an identified datacenter location. In some embodiments, the restart request is sent to an appropriate actuator operating at a datacenter. For instance, the remote management system 1040 may identity from the change request that the restart message should be sent to a message oriented middleware actuator 1925 (MOMA) at the datacenter location "US-West" 1010, as illustrated in FIG. 19.

FIG. 20 illustrates example operations of the back-end provisioning system to restart the dedicated server. In particular, this figure illustrates how an actuator (i.e., the MOMA 1925) (1) receives the restart request message, (2) validates the message, and (3) sends one or more messages to the PDU to restart the dedicated server. To facilitate these operations, the MOMA 1925 of some embodiments includes a processing queue 2010 for storing request messages, a message de-serializer 2015 for de-serializing the messages, a message validation module 2020 for validating the messages, and a request processor 2025 for processing the messages.

In some embodiments, the MOMA 1925 listens for messages such as a restart request and stores the messages in the processing queue 2010. When the restart request is ready to be processed, the MOMA 1925 may pop the request from the processing queue 2010 and start processing the restart request. However, if the message is serialized, the MOMA 1925 may first de-serialize the restart request to extract information contained in the restart request. This is illustrated in FIG. 20 as the message de-serializer 2015 receives the restart request from the processing queue 2010 and de-serializes the message.

Once the restart request is retrieved, the MOMA 1925 of some embodiments performs a validation operation. To perform the validation, the MOMA 1925 determines whether the restart request from the remote management system 1040 includes enough information to fulfill the restart request. For instance, the MOMA 1925 may make this determination based on the PDU information contained in the request such as the PDU ID and port number. In some embodiments, the MOMA 1925 may send a change request status to the remote management system 1040 that indicates whether the validation has passed or failed.

In some embodiments, the status of the restart request is forwarded from the remote management system 1040 to the multi-server control panel. The multi-server control panel may then display a graphical and/or textual element indicating that the request sent through the control panel is being processed or has failed. For instance, when the multi-server control panel receives the status update, it may display a graphical or textual representation indicating that the dedicated server is in the process of being restarted.

In the example illustrated in FIG. 20, after validating the restart request message, the MOMA 1925 sends one or more messages to a power strip that is coupled to the dedicated server 2035. In particular, the request processor 2025 receives the validated message and identifies several pieces of information relating to the PDU. In some embodiments, the information includes a device type of the PDU, PDU ID, port number, etc. The device type of the PDU may be necessary when a datacenter includes different types or brands of PDUs. That is, different types of PDUs may use different sets of communication protocols. Hence, by identifying the device type, the MOMA 1925 may identify the appropriate set of protocols to communicate with a particular PDU.

As shown in FIG. 20, the PDU 2030 receives one or more messages from the MOMA 1925 to restart the dedicated server 2035. The PDU 2030 identifies a port number from a message. The port number indicates the port of the PDU 2030 to which the dedicated server 2035 is connected. The PDU 2030 then cycles the power to the port to restart the dedicated server 2035. The dedicated servers 2040-2045 are not affected by the messages because they are connected to different ports of the PDU 2030.

In some embodiments, the back-end system at a particular datacenter includes a PDU controller that controls multiple power strips. FIG. 21 illustrate example operations performed by a PDU controller 2105 to restart the dedicated server 2035. As shown, the PDU controller controls power strips 2110 and 2115. Also, dedicated servers 2035-2045 are connected to power strip 2110, while dedicated servers 2120-2125 are connected to power strip 2115. In FIG. 21, to differentiate between power strip 2110 and 2115, the MOMA 2005 sends power strip information to the PDU controller. The PDU controller may then identify the power strip 2110 based on the power strip information and send the restart instructions to the appropriate power strip. For instance, the PDU controller may receive from the MOMA 2005 a PDU ID or PDU type that identifies power strip 2110.

Figure 22:
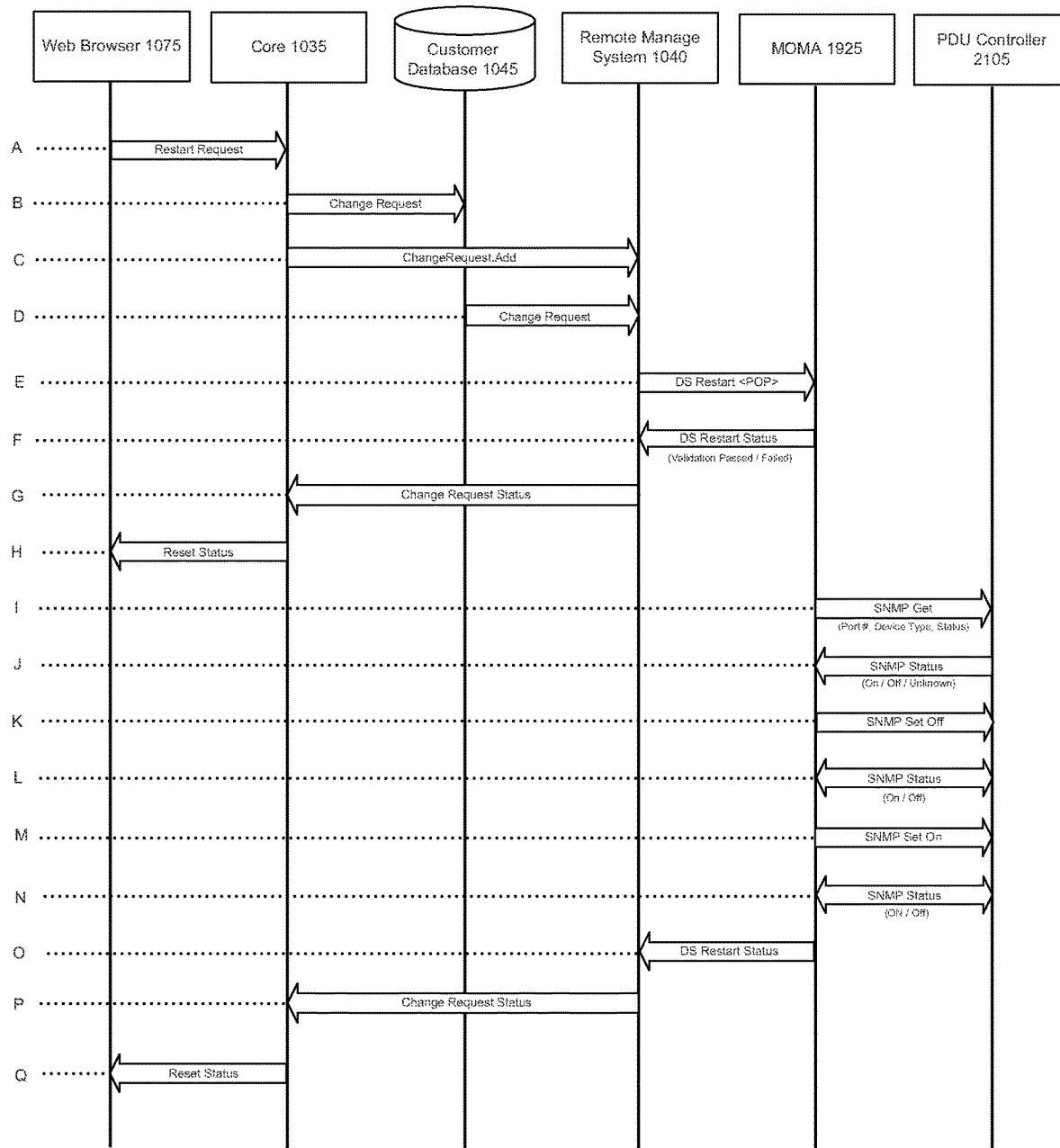
FIG. 22 is a message flow diagram that illustrates several examples messages exchanged between components of the hosting system to cycle a dedicated server.

FIG. 22 is a message flow diagram that illustrates several examples messages exchanged between components of the hosting system to cycle a dedicated server. As shown in FIG. 22, the sequence begins (at A) with the web browser 1075 sending a request to restart a dedicated server. A user might have initiated the restart operation by selecting a dedicated server representation and a restart control.

The core 1035 translates (at B) the restart request to a change request and stores the change request in the customer database 1045. The core 1035 sends (at C) a message to the remote management system 1040 indicating that a new change request has been added to the customer database 1045. Example operations performed by the core 1035 to create and store the change request are described above by reference to FIG. 18.

The remote management system 1040 retrieves (at D) the change request from the customer database 1045. The remote management (at E) sends a restart message to the MOMA 1925. In some embodiments, the restart message includes a location of a particular datacenter. The MOMA 1925 sends (at F) a restart request status to the remote management system 1040. In some embodiments, the restart request status is sent after the MOMA 1925 validates information contained in the restart message.

The remote management system 1040 sends (at G) a change request status message to the core 1035. In some embodiments, the change request status is based on the restart status received from the MOMA 1925. The core 1035 sends (at H) an update on the status of the restart request to the web browser 1075. The web browser 1075 may in turn display the status of the restart request.

The MOMA 1925 exchanges (at I-N) several messages with the PDU controller 2105 to restart the dedicated sever. As shown in FIG. 22, the MOMA 1925 and PDU controller 2105 exchanges messages using Simple Network Management Protocol (SNMP). However, the MOMA 1925 and PDU controller 2105 may exchange messages using a different protocol. The MOMA 1925 sends (at I) a SNMP Get message. In some embodiments, the get message includes a port number and a PDU ID. The PDU controller 2105 then returns (at J) an SNMP Status message that indicates whether the port specified in the SNMP Get message is on, off, or unknown. The PDU controller 2105 may send back an unknown or failure status when the controller cannot determine the status of the port. For instance, an unknown case may occur when the port number indicated in the SNMP Get message is incorrect or does not exist.

When it is determined that the PDU port is on, the MOMA 1925 sends (at K) SNMP Set Off message to the PDU controller 2105. In some embodiments, the MOMA 1925 then enters a processing loop to determine whether the specified port has been turned off. In the example illustrated in FIG. 21, the processing loop is represented by the MOMA 1925 and PDU controller 2105 exchanging (at L) status messages. When the PDU port is turned off, the MOMA 1925 sends (at M) an SNMP Set On message to the PDU controller 2105. The MOMA 1925 then enters a processing loop to determine whether the specified port has been turned on. This is shown in FIG. 21 with the MOMA 1925 and PDU controller 2105 exchanging (at N) status messages.

When the port is turned back on, the MOMA 1925 sends (at O) a restart status message to the remote management system 1040. The remote management system 1040 sends (at P) a change request status message to the core 1035. The core 1035 sends (at Q an update on the status of the restart request to the web browser 1075. In some embodiments, the web browser 1075 displays a graphical or textual element indicating that the dedicated server has been restarted.

Figure 23:
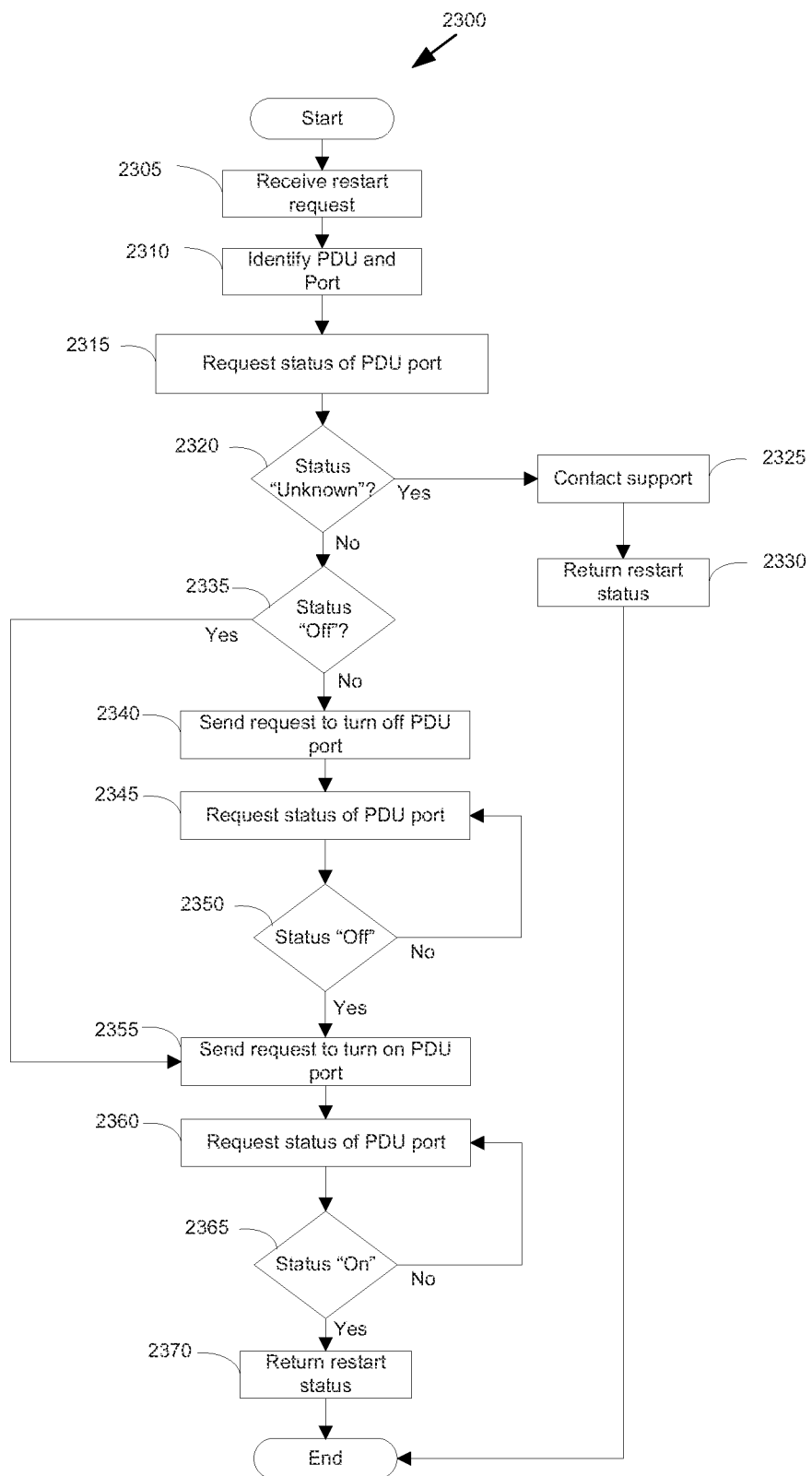
FIG. 23 conceptually illustrates a process for restarting a dedicated server.

FIG. 23 conceptually illustrates a process 2300 for restarting a dedicated server. In some embodiments, the process 2300 is performed by back-end logic of the hosting system. For instance, this process 2300 may be performed by an actuator (e.g., the MOMA 1925) operating in conjunction with a PDU controller (e.g., the PDU controller 2105).

The process 2300 starts when it receives (at 2305) a restart request. In some embodiments, the restart request is initially received through the multi-server control panel as described above by reference to FIG. 1. The restart request may include a PDU ID and a port number that the dedicated server is connected to. As described above, the front-end provisioning system may identify the PDU and port number based on information in an asset tracking data store (e.g., the asset database 1050).

The process 2300 then identifies (at 2310) a PDU and port number from the restart request. In some embodiments, the process 2300 identifies a device type, brand, or manufacturer of the PDU. For instance, the device type of the PDU may be necessary when a datacenter includes different types of PDUs using different sets of protocols for communication.

At 2315, the process 2300 requests the status of the port from the PDU. As mentioned above, in some embodiments, the status of the port include "On", "Off", and "Unknown". In some cases, the PDU will send back an unknown or failure status when the controller cannot determine the status of the port. For instance, an unknown or failure case may occur when the port number indicated is incorrect or does not exist.

The process 2300 determines (at 2320) whether the status of the port is unknown or the status inquiry has resulted in an error. When the status of the PDU port is unknown or the status inquiry has resulted in a failure, the process 2300 contacts (at 2325) support to indicate that there is an error in the system. For instance, when the status is unknown or there is no response, a system administrator may be notified to resolve this issue. This may require the administrator to check the physical connection and/or update data in the asset tracking data store. The process 2300 returns (at 2330) the status of the restart request. For instance, a status report may be reported back to the multi-server control panel to indicate to a user that the restart request could not be processed at this time.

When the status of the port is known, the process determines (at 2335) whether the port is in an off state. When the port is off, the process 2300 proceeds to 2355 in order to the port on. Otherwise, the process proceeds to 2340. The process 2300 sends (at 2340) a request to the PDU to turn off the port. The process 2300 then requests (at 2345) the status of the port.

The process 2300 then enters a processing loop to determine (at 2350) whether the request has been fulfilled by the PDU. The process 2300 may request the status of the PDU port in specific time intervals (e.g., every few seconds, milliseconds) to make the determination. When the port has been turned off, the process 2300 proceeds to 2355. Otherwise, the process returns to 2345 in order to make another status inquiry.

After turning off the port, the process 2300 turns on the PDU to start the dedicated server. Specifically, the process 2300 sends (at 2355) a request to the PDU to turn the port on. Again, the process 2300 then enters a processing loop to determine (at 2365) whether the request has been fulfilled by the PDU. The process 2300 may request the status of the PDU port in specific time intervals (e.g., every few seconds, milliseconds) to make the determination. When the port has been turned on, the process 2300 proceeds to 2370. Otherwise, the process returns to 2360 in order to make another status inquiry.

When the port is turned back on, the process 2300 returns (at 2370) the status of the restart request. For instance, a status report may be reported back to the multi-server control panel that indicates to the user that the dedicated server has been restarted.

V. Dedicated Servers on Same VLANs as Virtual Servers from Multiple Grids Using VLAN Translation Some embodiments provide a hosting system that defines separate broadcast domains for servers of separate entities (e.g., customers, companies, organizations) using virtual local area network (VLAN) translation. To place dedicated and virtual servers of each individual entity in its own broadcast domain, the hosting system of some embodiments includes a network switch configured to translate or map overlapping grid VLAN identifications (IDs) to local or switch VLAN IDs.

Figure 24:
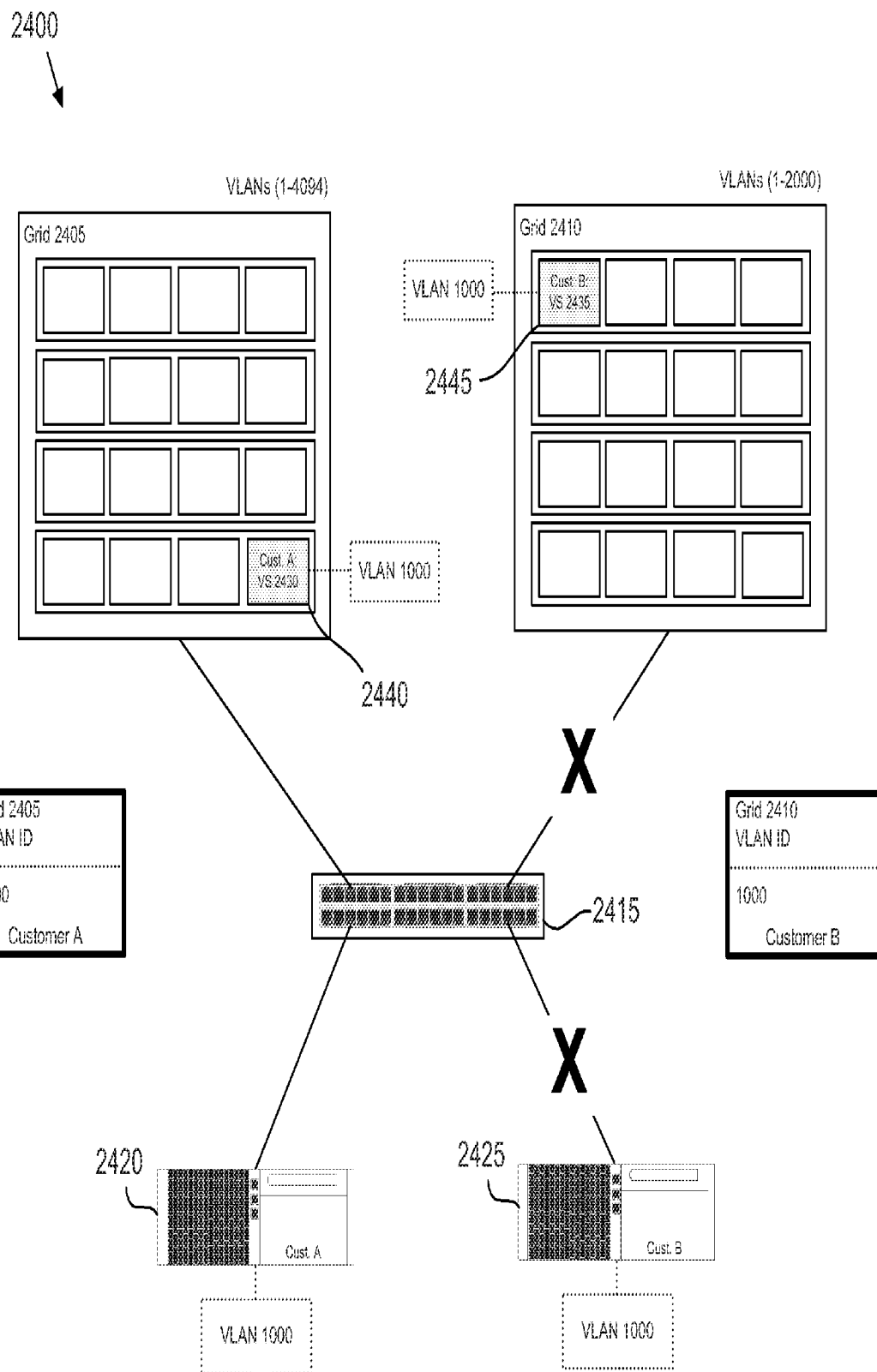
FIG. 24 illustrates a hosting system prior to virtual local area network (VLAN) translation.

FIG. 24 illustrates a hosting system 2400 prior to VLAN translation.

Specifically, this figure illustrates the problem of placing virtual and dedicated servers of different customers with overlapping VLAN IDs on a same network switch. As shown, the hosting system 2400 includes grids 2405 and 2410, a switch 2415, and dedicated servers 2420 and 2425. The dedicated server 2420 is provisioned for customer A, while the dedicated server 2425 is provisioned for customer B.

Each grid (2405 or 2410) includes several hardware nodes. Each hardware node in a grid may include one or more processing units (e.g., a CPU, multiple CPUs, CPUs with multiple processing cores, ASICs, graphics processing units, etc.), memory, block devices (e.g., disk storage devices), networking capabilities, and other such computing resources. Also, the resources of the grids 2405 and 2410 may be partitioned amongst multiple server configurations of different customers. For example, in FIG. 24, a virtual server 2430 for customer A is partitioned on a node 2440 of the grid 2405. Also, a virtual server 2435 for customer B is partitioned on a node 2445 of the grid 2410.

The switch 2415 may be a physical switch (e.g., a Top-Of-Rack, TOR, switch). The switch 2415 includes multiple ports for connecting the grids 2405 and 2410, and the dedicated servers 2420 and 2425. The switch may be a Layer 2 switch that uses Media Access Control (MAC) addresses to route frames of data. However, the switch may be another type of switch (e.g., Layer 3 switch) that uses other addresses (e.g., IP addresses) to route data (e.g., packets of data).

A VLAN protocol may limit the number of VLANs on a particular grid. For example, the VLAN protocol (e.g., IEEE 802.1q protocol) may specify that a VLAN ID includes 12 bits of data. This limits the maximum number of unique VLAN IDs to around 4096 ($2^{12}$) per grid. The maximum number of unique VLAN IDs causes a problem when there are more VLANs than the maximum number as illustrated in FIG. 24.

As shown in FIG. 24, the maximum number of VLANs having unique VLAN IDs has been reached in the grid 2405. The grid 2410 includes several VLANs with overlapping VLAN IDs as VLANs of the grid 2405. As a result, virtual and dedicated servers of different customers with overlapping VLAN IDs cannot be placed on the same switch 2415. For instance, the servers 2425 and 2435 of customer B are assigned a same VLAN IDs (i.e., VLAN 1000) as the servers 2420 and 2430 of customer A. This prevents the servers 2420-2435 of customers A and B being bridged on the same switch 2415 as it will break the logical division of the customers' network configurations.

Figure 25:
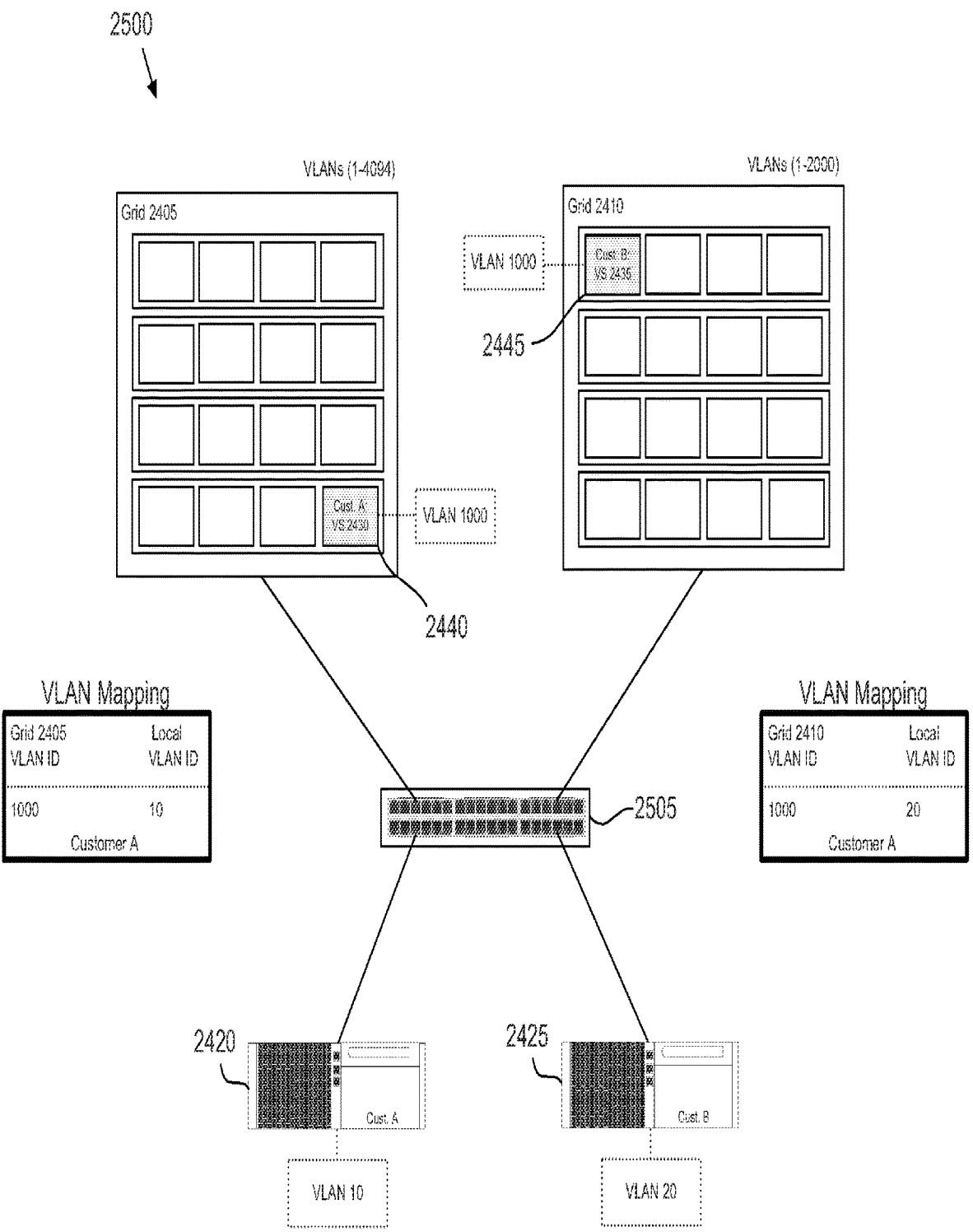
FIG. 25 illustrates placing servers of different customers on one switch using VLAN translation.

FIG. 25 illustrates placing servers of different customers on one switch using VLAN translation. Specifically, a hosting system 2500 extends broadcast domains with overlapping VLAN IDs from multiple grids 2405 and 2410 to a single switch 2505 using VLAN translation. For example, VLAN 1000 of customer A's virtual server 2430 in grid 2405 is mapped to VLAN 10 on the switch 2505, and VLAN 1000 of customer B's virtual server 2435 in grid 2410 is mapped to VLAN 20 on the switch 2505. This allows the dedicated servers 2420 and 2425 of customers A and B to be connected to the switch 2505 and have different local VLAN IDs. Hence, in the example illustrated in FIG. 25, broadcast domains with overlapping VLAN IDs from the grids 2405 and 2410 are extended while maintaining a unique VLAN ID for each customer on the switch 2505.

Figure 26:
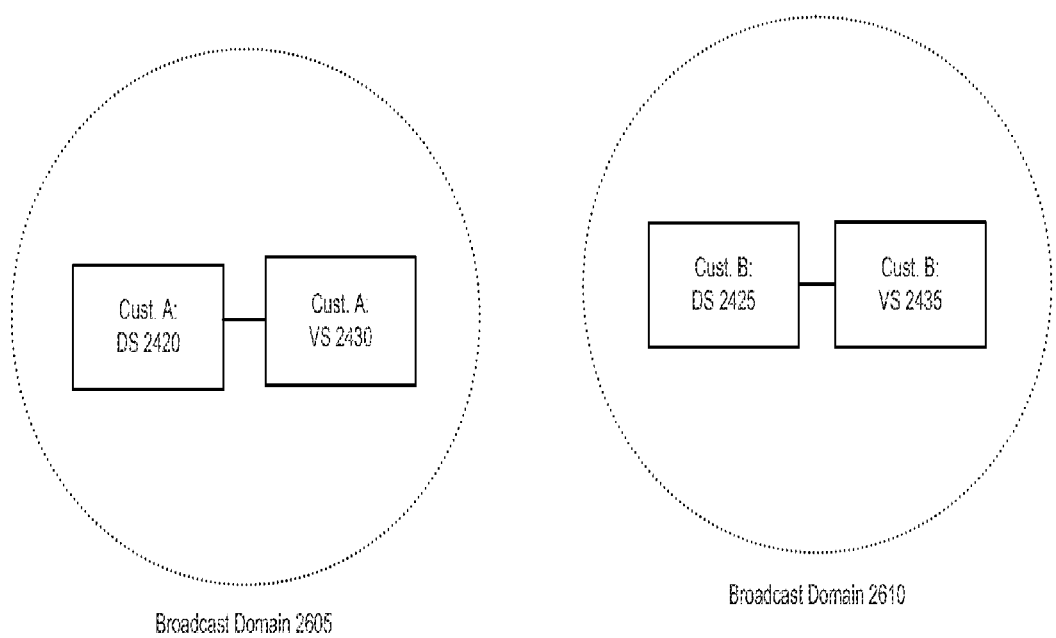
FIG. 26 illustrates two separate broadcast domains created by VLAN translation.

FIG. 26 illustrates two separate broadcast domains 2605 and 2610 created by the VLAN translation. Specifically, the servers 2420 and 2430 of customer A are on one broadcast domain 2605, while the server 2425 and 2435 of customer B are on a separate broadcast domain 2610. In some embodiments, a network switch is configured to translate VLAN ID tags in headers (e.g., 802.1Q headers) of all frames of data going between the network switch and any upstream switches. For instance, the VLAN translations may be done at the switch's port level. That is, the switch may not be aware of a virtual server's VLAN IDs of the grid prior to translation. However, when the switch identifies data (e.g., frame of data) going to a particular MAC address (e.g., of the virtual server), the switch may replace the local VLAN ID in the header with the virtual server's VLAN ID of the grid.

In some cases, one or more virtual server of a single customer is assigned both public and private VLANs. The customer's dedicated servers may need to connect to both broadcast domains so that the dedicated server's can communicate with the customer's virtual servers on the public VLAN as well as the private VLAN. In some embodiments, to ensure that both environments get adequate performance and maintain complete isolation, separate switches are utilized to connect the dedicated servers. Hence, each dedicated server may be coupled to ports on two separate switches. For instance, a dedicated server may be connected on a port of one switch for public VLAN and a port of another switch for private VLAN.

Figure 27:
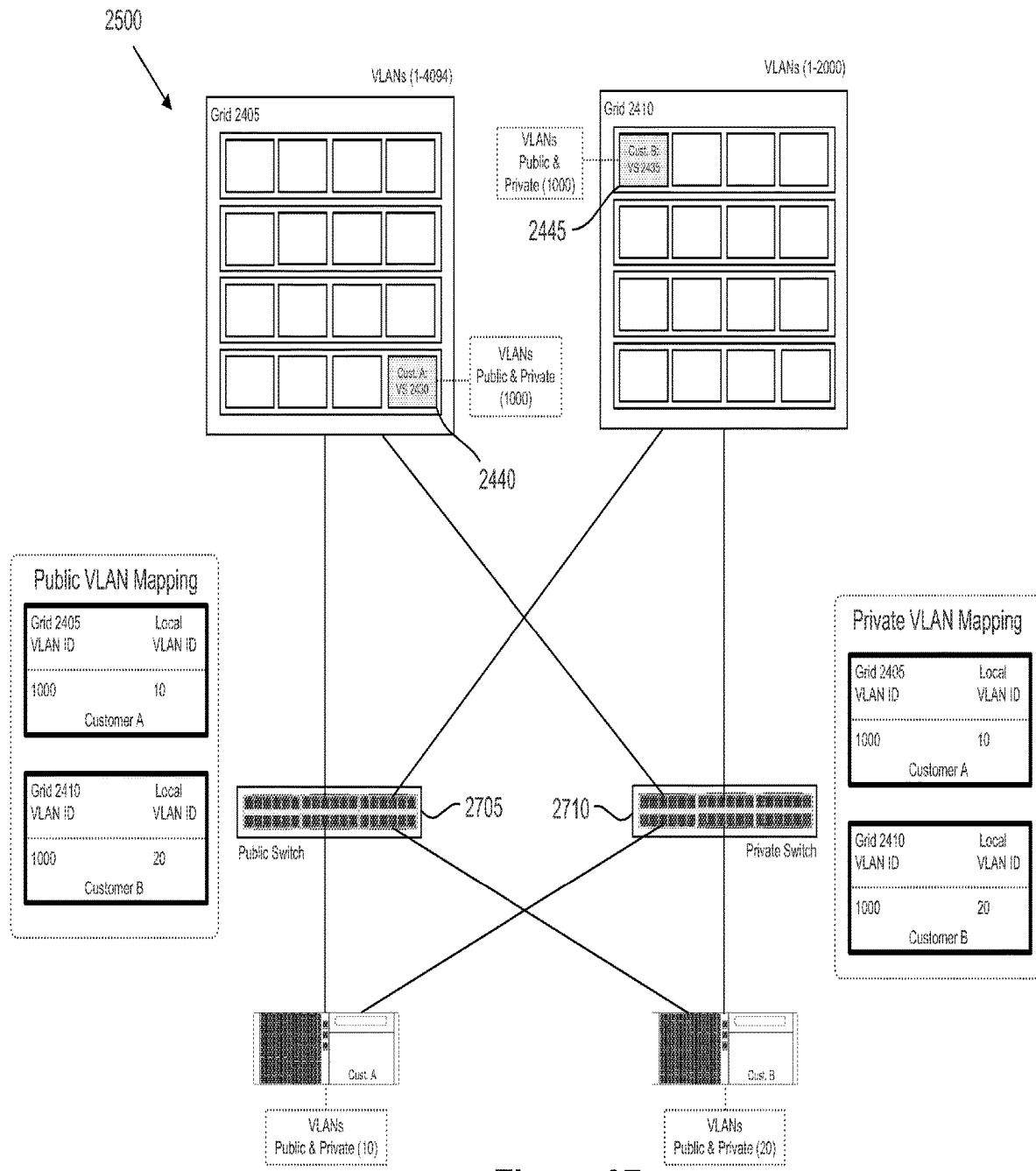
FIG. 27 illustrates using VLAN translation on multiple switches to support public and private VLANs.

FIG. 27 illustrates using VLAN translations on multiple switches 2705 and 2710 to support public and private VLANs. Specifically, in this example, the virtual server 2430 of customer A is assigned VLAN ID 1000 on the grid 2405 for its public network and VLAN ID 1000 for it private network. Both VLAN IDs are translated or mapped to VLAN ID 10 on their respective public and private switches (2705 and 2710) that are isolated from one another. Furthermore, the virtual server 2435 of customer B is assigned VLAN ID 1000 on the grid 2410 for its public network and VLAN ID 1000 for its private network, and both these VLAN IDs are translated or mapped to VLAN ID 20 on their respective public and private switches (2705 and 2710).

In the example described above, public and private VLAN IDs of a customer's virtual server are the same. However, the virtual server may be assigned different VLAN IDs for its public and private networks. Similarly, the local VLAN IDs of the virtual and dedicated servers for one customer may differ from one switch to another. In addition, in several of the examples described above, multiple grids and dedicated servers are placed on a same switch. In some cases, the number of translations a switch can perform may be limited by protocol to around 4096 ($2^{12}$) translation. In some embodiments, when one switch reaches a maximum number of translations, another network switch may be coupled to one or more grids to support additional VLAN translations.

VI. Computer System

Many of the above-described features and applications are implemented as software processes that are specified as a set of instructions recorded on a computer readable storage medium (also referred to as computer readable medium). When these instructions are executed by one or more computational element(s) (such as processors or other computational elements like ASICs and FPGAs), they cause the computational element(s) to perform the actions indicated in the instructions. "Computer" is meant in its broadest sense, and can include any electronic device with a processor. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" includes firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs when installed to operate on one or more computer systems define one or more specific machine implementations that execute and perform the operations of the software programs.

Figure 28:
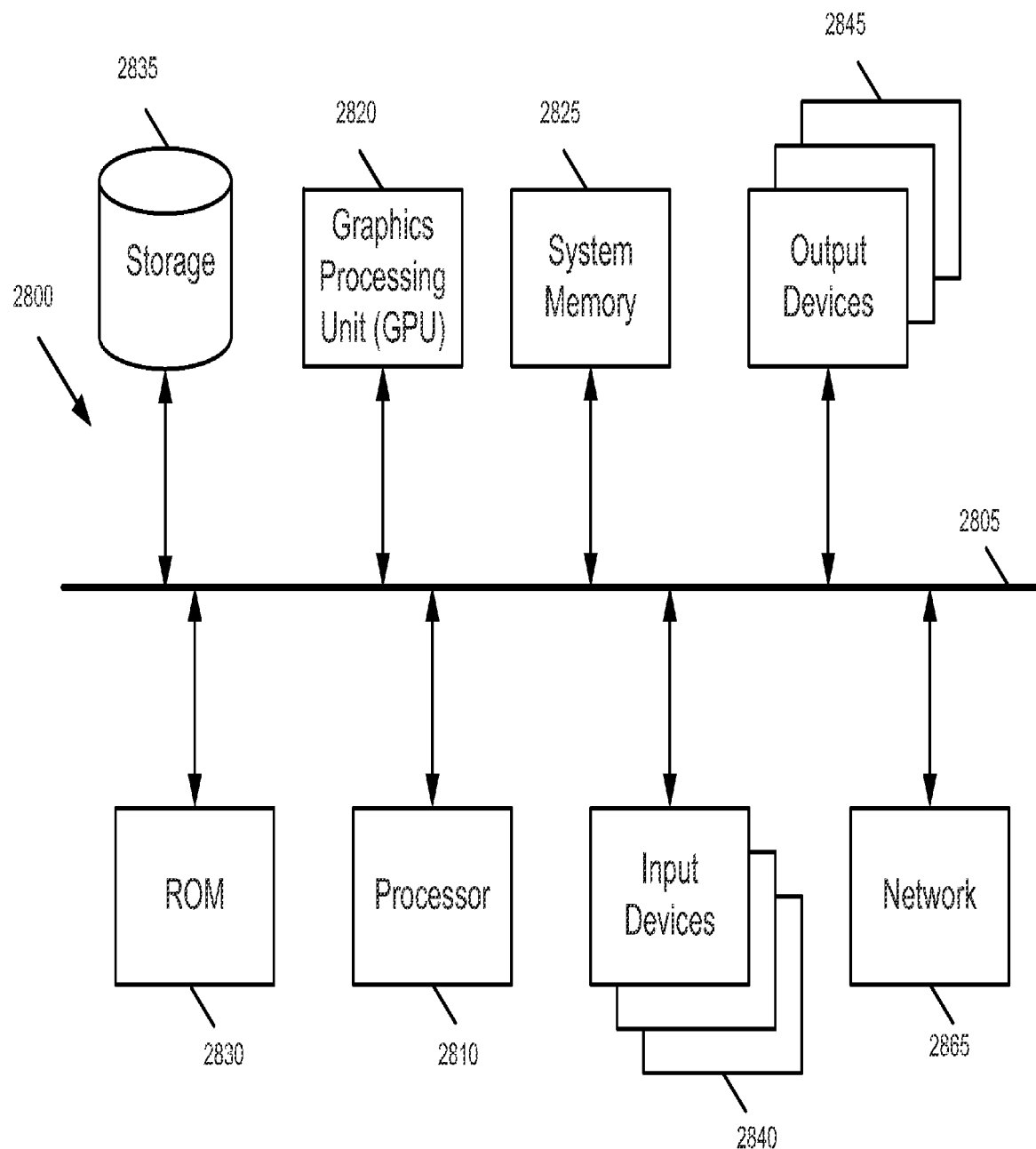
FIG. 28 illustrates a computer system with which some embodiments of the invention are implemented.

FIG. 28 illustrates a computer system with which some embodiments of the invention are implemented. Such a computer system includes various types of computer readable media and interfaces for various other types of computer readable media. Computer system 2800 includes a bus 2805, at least one processing unit (e.g., a processor) 2810, a graphics processing unit (GPU) 2820, a system memory 2825, a read-only memory 2830, a permanent storage device 2835, input devices 2840, and output devices 2845.

The bus 2805 collectively represents all system, peripheral, and chipset buses that communicatively connect the numerous internal devices of the computer system 2800. For instance, the bus 2805 communicatively connects the processor 2810 with the read-only memory 2830, the GPU 2820, the system memory 2825, and the permanent storage device 2835.

From these various memory units, the processor 2810 retrieves instructions to execute and data to process in order to execute the processes of the invention. In some embodiments, the processor comprises a Field Programmable Gate Array (FPGA), an ASIC, or various other electronic components for executing instructions. Some instructions are passed to and executed by the GPU 2820. The GPU 2820 can offload various computations or complement the image processing provided by the processor 2810.

The read-only-memory (ROM) 2830 stores static data and instructions that are needed by the processor 2810 and other modules of the computer system. The permanent storage device 2835, on the other hand, is a read-and-write memory device. This device is a non-volatile memory unit that stores instructions and data even when the computer system 2800 is off. Some embodiments of the invention use a mass storage device (such as a magnetic or optical disk and its corresponding disk drive) as the permanent storage device 2835.

Other embodiments use a removable storage device (such as a floppy disk, flash drive, or ZIP® disk, and its corresponding disk drive) as the permanent storage device. Like the permanent storage device 2835, the system memory 2825 is a read-and-write memory device. However, unlike storage device 2835, the system memory is a volatile read-and-write memory such as a random access memory. The system memory stores some of the instructions and data that the processor needs at runtime. In some embodiments, the invention's processes are stored in the system memory 2825, the permanent storage device 2835, and/or the read-only memory 2830. For example, the various memory units include instructions for processing multimedia items in accordance with some embodiments. From these various memory units, the processor 2810 retrieves instructions to execute and data to process in order to execute the processes of some embodiments.

The bus 2805 also connects to the input and output devices 2840 and 2845. The input devices enable the user to communicate information and commands to the computer system. The input devices 2840 include alphanumeric keyboards and pointing devices (also called "cursor control devices"). The output devices 2845 display images generated by the computer system. The output devices include printers and display devices, such as cathode ray tubes (CRT) or liquid crystal displays (LCD).

Finally, as shown in FIG. 28, bus 2805 also couples the computer 2800 to a network 2865 through a network adapter (not shown). In this manner, the computer can be a part of a network of computers (such as a local area network ("LAN"), a wide area network ("WAN"), an intranet, or a network of networks such as the Internet. Any or all components of computer system 2800 may be used in conjunction with the invention.

Some embodiments include electronic components, such as microprocessors, storage, and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by a device such as an electronics device, a microprocessor, a processor, a multi-processor (e.g., a chip with several processing units on it) and includes sets of instructions for performing various operations. The computer program excludes any wireless signals, wired download signals, and/or any other ephemeral signals Examples of hardware devices configured to store and execute sets of instructions include, but are not limited to, application specific integrated circuits (ASICs), field programmable gate arrays (FPGA), programmable logic devices (PLDs), ROM, and RAM devices. Examples of computer programs or computer code include machine code, such as is produced by a compiler, and files including higher-level code that are executed by a computer, an electronic component, or a microprocessor using an interpreter.

As used in this specification and any claims of this application, the terms "computer", "server", "processor", and "memory" all refer to electronic or other technological devices. These terms exclude people or groups of people. For the purposes of the specification, the terms "display" or "displaying" mean displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the Figures (including FIGS. 17 and 23) conceptually illustrate processes. The specific operations of these processes may not be performed in the exact order shown and described. Specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A hosting system, comprising:
a switch configured to, in response to a first virtual server and a second virtual server having overlapping virtual local area network (VLAN) identifications (IDs), define a first broadcast domain for a first user and a second broadcast domain for a second user, place the first virtual server and a first dedicated server in the first broadcast domain, and place the second virtual server and a second dedicated server in the second broadcast domain;
wherein the switch is further configured to define the first broadcast domain and the second broadcast domain by assigning respective local VLAN IDs to the first and second dedicated servers, and mapping the overlapping VLAN IDs of the first and second virtual servers to the respective local VLAN IDs.

2. The hosting system of claim 1, wherein the virtual servers are provisioned on a plurality of grids of hardware nodes.

3. The hosting system of claim 2, wherein a first grid of hardware nodes of the plurality of grids is at a first datacenter location and a second grid of hardware nodes of the plurality of grids is at a second datacenter location.

4. The hosting system of claim 2, further comprising: a set of computing devices configured to receive a plurality of virtual server configurations and provision the plurality of virtual servers on the plurality of grids of hardware nodes based on the plurality of virtual server configurations.

5. The hosting system of claim 1, wherein the first virtual server is on a first grid and the second virtual server is on a second grid.

6. The hosting system of claim 1, further comprising: a set of computing devices configured to receive a plurality of dedicated server configurations and provision the plurality of dedicated servers based on the plurality of dedicated server configurations.

7. The hosting system of claim 1, wherein the switch is configured to define a first set of broadcast domains for public VLANs, and wherein the hosting system further comprises a second switch configured to define a second set of broadcast domains for private VLANs.

8. A method of hosting, comprising:
determining whether a first virtual server and a second virtual server have overlapping virtual local area network (VLAN) identifications (IDs);
assigning a first local VLAN ID to a first dedicated server and a second local VLAN ID to a second dedicated server when the first virtual server and the second virtual server have overlapping VLAN IDs;
defining a first broadcast domain for a first user and a second broadcast domain for a second user based at least in part on the first and second local VLAN IDs;
placing the first virtual server and the first dedicated server in the first broadcast domain; and
placing the second virtual server and the second dedicated server in the second broadcast domain.

9. The method of claim 8, wherein defining the first broadcast domain and the second broadcast domain comprises: translating the overlapping VLAN IDs to the first and second local VLAN IDs.

10. The hosting system of claim 8, wherein the virtual servers are provisioned on a plurality of grids of hardware nodes.

11. The method of claim 10 further comprising: placing a first grid of the hardware nodes at a first datacenter location and placing a second grid of the hardware nodes at a second datacenter location.

12. The method of claim 8, further comprising: receiving a plurality of virtual server configurations at a set of computing devices; and wherein the provisioning the plurality of virtual servers is performed by the set of computing devices based on the plurality of virtual server configurations.

13. The method of claim 8, further comprising: receiving, at a set of computing devices, a plurality of dedicated server configurations; and provisioning, by the set of computing devices, the plurality of dedicated servers based on the plurality of dedicated server configurations.

14. The method of claim 8, further comprising: defining a first set of broadcast domains for public VLANs using the switch, and defining a second set of broadcast domains for private VLANs using a second switch.

15. A system, comprising:
a memory;
a processor coupled to the memory, the processor configured to, based on instructions stored in the memory, perform operations including:
determining whether a first virtual server and a second virtual server have overlapping virtual local area network (VLAN) identifications (IDs);
assigning a first local VLAN ID to a first dedicated server and a second local VLAN ID to a second dedicated server when the first virtual server and the second virtual server have overlapping VLAN IDs;
defining a first broadcast domain for the first user and a second broadcast domain for the second user based at least in part on the first and second local VLAN IDs;
placing the first virtual server and the first dedicated server in the first broadcast domain; and
placing the second virtual server and the second dedicated server in the second broadcast domain.

16. The system of claim 15, wherein defining the first broadcast domain and the second broadcast domain comprises translating the overlapping VLAN IDs to the first and second local VLAN IDs.

17. The system of claim 15, wherein the operations further include: receiving a plurality of virtual server configurations.

18. The system of claim 17, wherein the operations further include provisioning the plurality of virtual servers on a grid of hardware nodes based on the plurality of virtual server configurations.

19. The system of claim 15, wherein the operations further include: receiving a plurality of dedicated server configurations; and provisioning the plurality of dedicated servers based on the plurality of dedicated server configurations.

20. The system of claim 15, wherein the operations further include: defining a first set of broadcast domains for public VLANs using a first switch, and defining a second set of broadcast domains for private VLANs using a second switch.

* * * * *